United States Patent
Wada et al.

(10) Patent No.: US 6,694,203 B2
(45) Date of Patent: Feb. 17, 2004

(54) METHOD FOR MANUFACTURING A SUBSTRATE-FOR-WIRING/ WIRING HARNESS

(75) Inventors: Akio Wada, Hyogo (JP); Kaneyoshi Shimizu, Osaka (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/115,468

(22) Filed: Apr. 2, 2002

(65) Prior Publication Data

US 2002/0165632 A1 Nov. 7, 2002

Related U.S. Application Data

(62) Division of application No. 09/111,191, filed on Jul. 7, 1998, now Pat. No. 6,438,435.

(30) Foreign Application Priority Data

Jul. 7, 1997 (JP) ............................................ 9-181138

(51) Int. Cl.[7] .............................................. G06F 19/00
(52) U.S. Cl. ............................ 700/97; 700/17; 700/83; 700/96; 700/98; 700/115; 700/116; 700/213; 29/851; 29/861; 29/749; 29/255; 29/757
(58) Field of Search ............................. 700/17, 83, 95, 700/96, 97, 98, 213, 115, 116; 29/851, 861, 853, 749, 255, 757, 866–867, 564.8, 564.4, 564.6

(56) References Cited

U.S. PATENT DOCUMENTS

| | | | |
|---|---|---|---|
| 3,946,768 A | | 3/1976 | Fiorentino |
| 4,912,644 A | * | 3/1990 | Aoyama et al. ............... 700/98 |
| 5,033,188 A | * | 7/1991 | Polliard et al. ................ 29/861 |
| 5,050,093 A | * | 9/1991 | Reddy et al. .................. 702/36 |
| 5,067,379 A | * | 11/1991 | Butler et al. .................... 83/13 |
| 5,083,369 A | * | 1/1992 | Cerda ........................... 29/857 |
| 5,109,479 A | | 4/1992 | Williams |
| 5,127,062 A | * | 6/1992 | Cerda ........................... 382/100 |
| 5,140,873 A | | 8/1992 | Schwartzman |
| 5,282,311 A | * | 2/1994 | Tamura ......................... 29/825 |
| 5,483,459 A | * | 1/1996 | Tamura ......................... 29/825 |
| 5,506,950 A | * | 4/1996 | Hughes et al. ................ 345/420 |
| 5,514,966 A | * | 5/1996 | Kawamura et al. ......... 324/539 |
| 5,623,753 A | * | 4/1997 | Tamura ...................... 29/33 M |
| 5,864,482 A | * | 1/1999 | Hazama et al. ............... 700/95 |
| 6,169,934 B1 | | 1/2001 | Nakayama et al. |
| 6,438,435 B1 | * | 8/2002 | Wada et al. ................... 700/97 |

FOREIGN PATENT DOCUMENTS

| | | |
|---|---|---|
| EP | 304 866 | 3/1989 |
| EP | 424 189 | 4/1991 |
| JP | 62-166700 | 10/1987 |
| JP | 63-058712 | 3/1988 |

* cited by examiner

*Primary Examiner*—Ramesh Patel
(74) *Attorney, Agent, or Firm*—Merchant & Gould P.C.

(57) ABSTRACT

Method for manufacturing a wiring harness or a substrate for wiring wherein the wiring diagram applied to the substrate is based on the wiring harness information. Entities representing connectors, binding parts, and wiring length information of wirings are input. The wiring arrangement diagram includes lines that correspond to the wirings and do not have a length corresponding to actual length of the wirings. The wiring harness is made using the information including total length of wiring between each of the connectors, harness information generated based on the entities, and the length information of the desired wiring arrangement. Alternatively, the wiring harness information is used to draw a wiring diagram for fixing on the substrate.

4 Claims, 31 Drawing Sheets

THE FIRST EMBODIMENT

FIG.1 THE FIRST EMBODIMENT

FLOW CHART OF WIRING HARNESS INFORMATION PROCESSING

| REMARKED CONNECTOR-TERMINAL | OPPONENT CONNECTOR-TERMINAL | TYPES OF ELECTRIC CABLE | COLORS OF ELECTRIC CABLE |
|---|---|---|---|
| J2080M-1 | | | |
| J2080M-2 | | | |
| J2080M-3 | J51B-1 | UL1061AWG26 | YELLOW |
| J2080M-4 | J51B-2 | UL1061AWG26 | RED |
| J2080M-5 | J51B-3 | UL1061AWG26 | BLUE |

| HOW TO FIX | NUMBER OF TERMINALS | PARTS NUMBER | COLOR OF CONNECTOR |
|---|---|---|---|
| CRIMPING | 5 | 05ZR-8M | RED |

GENERATING A CONNECTION LENGTH TABLE

FIG.10A

| END "A" OF A WIRING ROUTE | END "B" OF A WIRING ROUTE | TOTAL LENGTH | | | | |
|---|---|---|---|---|---|---|
| J100 | J101 | | | | | |
| | | | | | | |
| | | | | | | |
| | | | | | | |

FIG.10B

| END "A" OF A WIRING ROUTE | END "B" OF A WIRING ROUTE | TOTAL LENGTH | | | | |
|---|---|---|---|---|---|---|
| J100 | J101 | | | | | |
| J100 | J102 | | | | | |
| J101 | J105 | | | | | |
| J103 | J104 | | | | | |

FIG.10C

| END "A" OF A WIRING ROUTE | END "B" OF A WIRING ROUTE | TOTAL LENGTH | | | | |
|---|---|---|---|---|---|---|
| J100 | J101 | 240 | 50 | 40 | 70 | 80 |
| J100 | J102 | 80 | 50 | 30 | | |
| J101 | J105 | 120 | 120 | | | |
| J103 | J104 | 130 | 40 | 70 | 20 | |

FIG.10D

| END "A" OF A WIRING ROUTE | END "B" OF A WIRING ROUTE | TOTAL LENGTH | | | | | CORRECTION |
|---|---|---|---|---|---|---|---|
| J100 | J101 | 241 | 50 | 40 | 70 | 80 | 1 |
| J100 | J102 | 81 | 80 | 30 | | | 1 |
| J101 | J105 | 120 | 120 | | | | |
| J103 | J104 | 132 | 40 | 70 | 20 | | 2 |

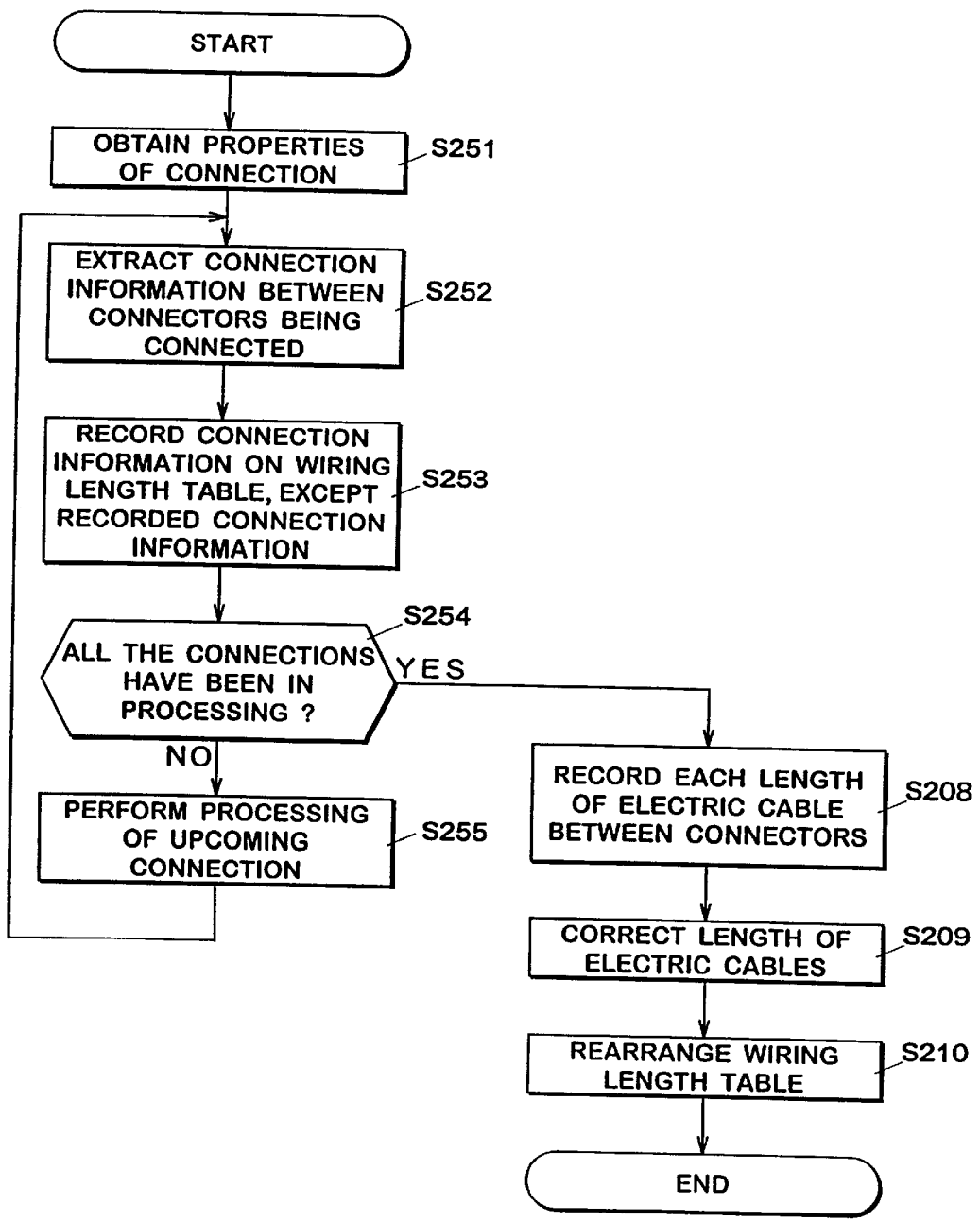

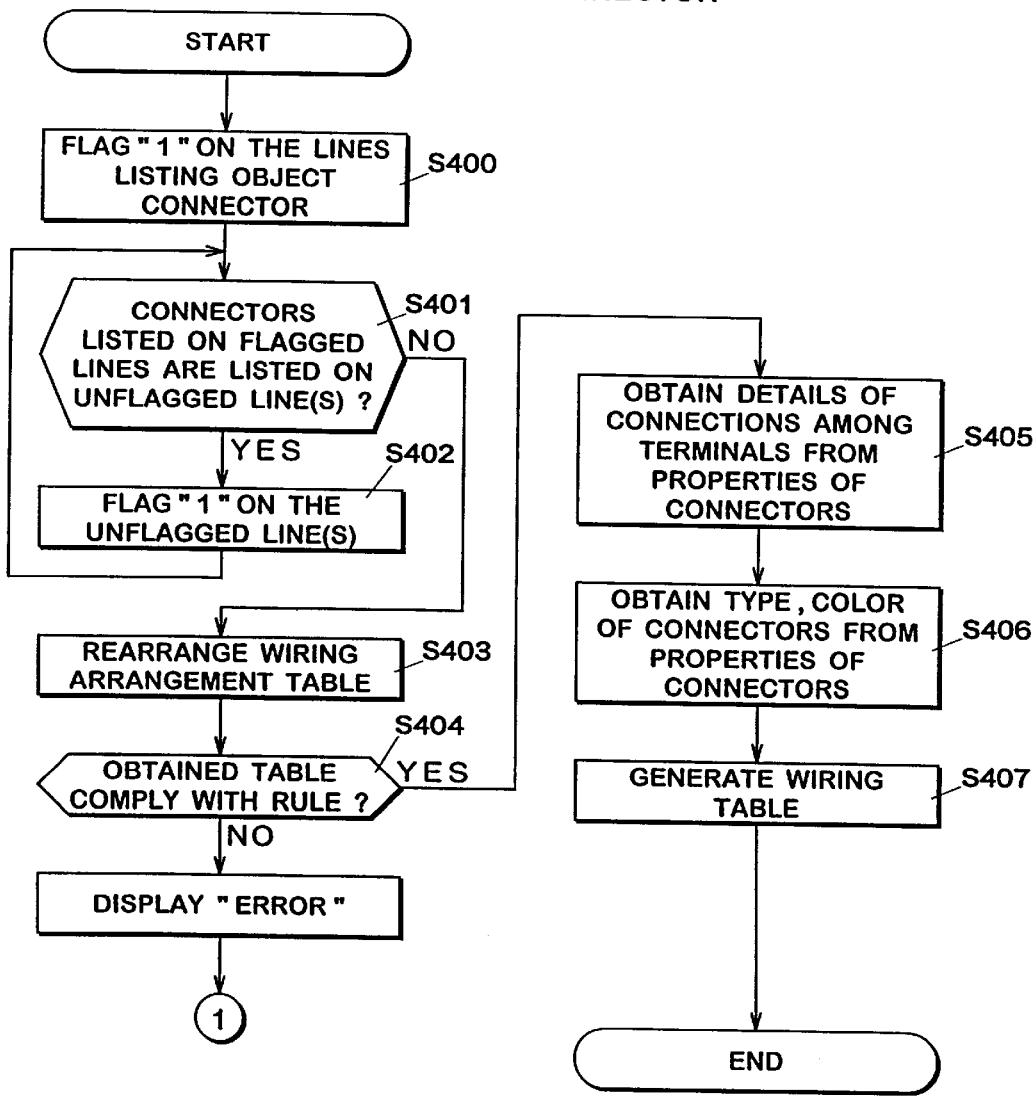

FIG.14A

| END "A" OF A WIRING ROUTE | END "B" OF A WIRING ROUTE | TOTAL LENGTH | FLAG |
|---|---|---|---|
| J100 | J101 | 241 | 1 |
| J100 | J102 | 81 | |
| J101 | J105 | 120 | 1 |
| J103 | J104 | 132 | |

FIG.14B

| END "A" OF A WIRING ROUTE | END "B" OF A WIRING ROUTE | TOTAL LENGTH | FLAG |
|---|---|---|---|
| J100 | J101 | 241 | 1 |
| J100 | J102 | 81 | 1 |
| J101 | J105 | 120 | 1 |
| J103 | J104 | 132 | |

FIG.14C

| END "A" OF A WIRING ROUTE | END "B" OF A WIRING ROUTE | TOTAL LENGTH | FLAG |
|---|---|---|---|
| J101 | J100 | 241 | 1 |
| J101 | J105 | 120 | 1 |
| J100 | J102 | 81 | 1 |
| | | | |
| J103 | J104 | 132 | |

FIG.16

WIRING TABLE

| CONNECTOR-TERMINAL | CONNECTOR-TERMINAL | TOTAL LENGTH | TYPES OF ELECTRIC CABLE | COLORS OF ELECTRIC CABLE |
|---|---|---|---|---|
| J101-1 | J100-1 | 241 | UL1061AWG26 | YELLOW |
| J101-2 | J100-2 | 241 | UL1061AWG26 | RED |
| J101-3 | J105-1 | 120 | UL1061AWG26 | BLUE |
| J101-4 | J105-2 | 120 | UL1061AWG26 | BLUE |
| J101-5 | | | | |
| J100-3 | J102-1 | 81 | UL1061AWG26 | GREY |
| J100-4 | J102-2 | 81 | UL1061AWG26 | BLUE |

INDEPENDENT WIRING HARNESS DIAGRAM

INDEPENDENT WIRING HARNESS DIAGRAM

FIG.20

WIRING TABLE

| CONNECTOR-TERMINAL | CONNECTOR-TERMINAL | TOTAL LENGTH | TYPES OF ELECTRIC CABLE | COLORS OF ELECTRIC CABLE |
|---|---|---|---|---|
| J101-1 | J100-1 | 240 | UL1061AWG26 | YELLOW |
| J101-2 | J100-2 | 240 | UL1061AWG26 | RED |
| J101-3 | J105-1 | 120 | UL1061AWG26 | BLUE |
| J101-4 | J105-2 | 120 | UL1061AWG26 | BLUE |
| J101-5 | | | | |
| J100-3 | J102-1 | 80 | UL1061AWG26 | GREY |
| J100-4 | J102-2 | 80 | UL1061AWG26 | BLUE |
| | | | | |
| J104-1 | J103-1 | 130 | UL1061AWG26 | RED |
| J104-2 | J103-2 | 130 | UL1061AWG26 | BLUE |

FIG.21 THE SECOND EMBODIMENT

FIG.25

CONNECTION INFORMATION TABLE

| NO. | WIRING ROUTE | TYPES OF ELECTRIC CABLE | COLORS OF ELECTRIC CABLE | TOTAL LENGTH | COMMENT | RENEWAL NO. | EDITOR |
|---|---|---|---|---|---|---|---|
| 1 | J101-1 — J100-1 | U110G1 AWG2G | Y | | | | |
| 2 | J101-2 — J100-2 | U110G1 AWG2G | R | | | | |
| 3 | J101-3 — J105-1 | U110G1 AWG2G | B | | | | |
| 4 | J101-4 — J105-2 | U110G1 AWG2G | B | | | | |
| 5 | J101-5 — | | | | | | |
| 6 | J100-3 — J102-1 | U110G1 AWG2G | G | | | | |
| 7 | J100-4 — J102-2 | U110G1 AWG2G | B | | | | |
| 8 | — | | | | | | |
| 9 | J104-1 — J103-1 | U110G1 AWG2G | R | | | | |
| 10 | J104-2 — J103-2 | U110G1 AWG2G | B | | | | |
| 11 | — | | | | | | |
| 12 | — | | | | | | |
| 13 | — | | | | | | |
| 14 | — | | | | | | |
| 15 | — | | | | | | |

GENERATING A CONNECTION LENGTH TABLE

PROCESSING FOR CONVERTING INTO ACTUAL SIZES

FIG.30

LIST

|  | FLAG |
|---|---|
| T. 24 | 1 |
| J1 |  |
| T. 36 |  |
| T. 13 |  |
|  |  |

# METHOD FOR MANUFACTURING A SUBSTRATE-FOR-WIRING/ WIRING HARNESS

This application is a divisional of application Ser. No. 09/111,191, filed Jul. 7, 1998, now U.S. Pat. No. 6,438,435 which application are incorporated herein by reference.

CROSS-REFERENCE TO RELATED APPLICATION

The entire disclosure of Japanese Patent Application No. Hei 9-181138 filed on Jul. 7, 1997 and Hei 10-189994 filed on Jul. 6, 1998 including specification, claims, drawings and summary are incorporated herein by reference in entirety.

BACKGROUND OF INVENTION

1. Field of the Invention

This invention relates an apparatus and a method for generating a wiring harness diagram used for manufacturing of wiring harnesses.

2. Description of the Prior Art

Recently, various apparatuses for automatically manufacturing wiring harnesses have been proposed such as Japanese patent laid open publication No. SHO 63-58712 and others. In order to manufacture wiring harnesses with the apparatuses, the following steps need to be carried out before the manufacturing processes. At first, a wiring condition is determined in accordance with given circuit diagram(s). Then, the wiring harness(es) independent from others (hereinafter referred to as independent wiring harness) is found based on the wiring condition thus determined. Thereafter, connection between connectors, a length of wire(s) allocated between the connectors and a type of the wire(s) in the independent wiring harness should be obtained.

These steps require a certain period of experience. Even though, the designer of the wiring harness(es) has enough experience in designing thereof, there is still a high probability of making mistakes and/or miscalculations when wiring harnesses have a complex wiring. Further, the designer needs to carry out the steps again whenever a circuit diagram(s) is redesigned, so that the efficiency of the manufactured harness will be relatively low.

SUMMARY OF THE INVENTION

It is an object of the present invention to overcome the above mentioned problems associated with prior art, and to provide an apparatus and a method capable of easily generating and modifying a wiring harness diagram being used for manufacturing of wiring harnesses.

In accordance with characteristics of the present invention, the operator obtains a desired wiring arrangement diagram by using entity input means and numeral value input means by referring to entities and length information displayed on display means while generating wiring harness information including a total length of the wiring between each connector in the desired wiring arrangement in accordance with the entities and the length information of the desired wiring arrangement. Therefore, it is possible to generate the wiring harness information including a total length of the wiring between each connector easily as well as inputting the desired wiring arrangement by referred to the displays.

Also, in accordance with characteristics of the present invention, connection information representing connections between each of the connectors are inputted to the apparatus of the present invention. In this way, the wiring harness information including connections between the connectors can easily be generated.

Further, in accordance with characteristics of the present invention, the connection information are inputted from an apparatus for designing circuits in the apparatus of the present invention. It is therefore possible to use the connection information being used during the design work with the apparatus of the present invention.

Still further, in accordance with characteristics of the present invention, an entity representing a connection between the connectors is also inputted in the apparatus of the present invention. In this way, a desired wiring arrangement can be inputted while displaying connections between the connectors on a display screen.

In accordance with characteristics of the present invention, the wiring harness information for outputting a wiring diagram illustrated in actual lengths of the wirings are generated in accordance with the entities and the length information. Therefore, it is possible to obtain a wiring substrate by fixing the wiring diagram thereon illustrated in actual size on the substrate at a proper position.

Also, in accordance with characteristics of the present invention, a wiring arrangement diagram not illustrating actual length of the wirings is displayed on the display device while outputting the wiring diagram illustrating actual length of the wiring from a printing device. In this way, the wiring diagram can easily be previewed on the display screen while obtaining the wiring diagram illustrated in actual size on a paper.

Further, in accordance with characteristics of the present invention, the wiring harness information of an independent wiring harness being connected to each other as a group is generated in accordance with the entities and the length information. Therefore, it is possible to obtain an independent wiring harness diagram or the like by just inputting an overall wiring arrangement diagram.

Still further, in accordance with characteristics of the present invention, the wiring harness information of the independent wiring harnesses including the connection information of each terminal between each connector is generated by additionally considering the connection information of each terminal between each of the connectors thus inputted. It is therefore possible to generate the independent harness diagram illustrating greater details.

In addition, the connection information of each terminal between each of the connectors corresponds to the entity representing the connector, binding part and the wiring. In this way, it is possible to recognize details of the connection data easily.

Further, in accordance with characteristics of the present invention, a judgement is carried out whether or not connection status of wiring in the independent wiring harness being extracted comply with a predetermined rule. It is therefore possible to judge whether or not the independent wiring harness which will be extracted comply with the predetermined rule by just inputting the overall wiring arrangement diagram. As a result, an independent wiring harness which does not comply with the rule can be rejected during the generation of the overall wiring arrangement diagram.

Still further, in accordance with characteristics of the present invention, correction of a given length of the wiring is performed by considering a length of displacement in actual wiring work as a correction value. In this way, the wiring harness having accurate length can be obtained in consideration of the length of displacement in the actual wiring work.

In accordance with characteristics of the present invention, the correction value at least includes a length caused by displacement of the wiring work or a margin for crimping the connector terminals. It is therefore possible to avoid displacement caused by the wiring work or the margin for crimping the connector terminals both having a great influence on the displacement during the actual wiring work.

Also, in accordance with characteristics of the present invention, part of the wiring harness information is provided to a wiring harness manufacturing device, the part of the wiring harness information being used in the wiring harness manufacturing device. In this way, data used in the wiring harness manufacturing device can be set automatically.

Further, in accordance with characteristics of the present invention, the wiring harness diagram is generated by performing the steps of: displaying connector and binding parts on a display screen and connecting therebetween with wiring as well as providing connection data between each connector, providing a length of the wiring connecting the connectors and the binding parts, and outputting the independent wiring harness diagram being connected to each other as a group in accordance with the wiring arrangement diagram and the length of the wiring. It is therefore possible to obtain the independent harness diagram easily while inputting a predetermined wiring arrangement while referring to the displays on the display screen.

Still further, in accordance with characteristics of the present invention, a substrate for wiring is manufactured by performing the steps of: directly drawing a wiring diagram in actual size on the substrate or fixing a sheet illustrating the wiring diagram in actual size on the substrate, and disposing a supporting member for wiring to at least a position of locating a binding part in the wiring diagram. In this way, position for disposing the supporting members to each binding part can be determined easily and accurately.

In accordance with characteristics of the present invention, a method for manufacturing a wiring harness using a computer, comprises steps of: inputting entities representing connectors, binding parts, wiring length information of the wirings from an input device, inputting a desired wiring arrangement from the input device by referring to a wiring arrangement diagram generated in basis of the entities and the length information and displayed on a display device, and making the wiring harness using information including a total length of the wiring between each connector, wherein the harness information is generated on the basis of the entitles and the length information of the desired wiring arrangement. It is therefore possible to make the manufacturing process easier as a result of easily obtaining the wiring harness information including a total length of the wiring between each connector as well as inputting the desired wiring arrangement with reference to the displays.

Also, in accordance with characteristics of the present invention, the wiring harness information is generated by additionally considering the connection information of each terminal between each of the connectors being inputted from an apparatus for designing circuits. In this way, the connection information being used during the design work can be also used in the manufacturing processes.

Definition of words and phrases used in the specification for describing the present invention as well as correspondence in the embodiment herein are as follows.

"Entity input means" is means for inputting instructions for arranging at least entities representing connectors, binding parts and wirings. The entity input means includes not only a mouse or a tracker ball, but also includes other devices such as cursor keys of a keyboard. In the embodiments herein, the mouse 2 corresponds to the entity input means.

"Numeral value input means" is means for inputting lengths of the wirings relatedly with at least each of the entities representing the wirings. The numeral value input means includes not only the keyboard, but also the mouse or the tracker ball by which the numeral value displayed on the screen is selected. In the embodiments which will be described hereunder, the keyboard 4 corresponds to the numeral value input means.

"Wiring harness information" means information about wiring harness including at least a total length of the wiring between the connectors.

"Wiring harness information" includes any form of information, such as drawings numeral values or characters. Further, the phrase "total lengths of the wirings between the connectors" mentioned above include the lengths represented in the form of numeral values, actual lengths (actual sizes, or reduced sizes, enlarged sizes and in numeral values) in illustrated drawings or the like. In the embodiments described hereunder, a wiring length table shown in FIG. 10, wiring table illustrated in both FIGS. 13 and 19, an independent wiring harness diagram shown in FIG. 16 and a wiring diagram illustrated in FIG. 30 corresponds to the "wiring harness information" respectively. Further, step S2, step S4, step S4, step S5, step S6 and step S7 shown in FIGS. 3 and 22 corresponds to the "wiring harness information generating means".

"Wiring" is a line for connecting between connectors, and includes an electric cable, a fiber or the like.

"Apparatus for designing circuits" is an apparatus for designing circuits, and the apparatus is at least capable of outputting connection information of the connectors.

While the novel features of the invention are set forth in a general fashion, both as to organization and content, it will be better understood and appreciated, along with other objects and features thereof, from the following detailed description taken in conjunction with the drawings.

BRIEF DESCRIPTION OF THE DRAWINGS

FIG. 10A is a view illustrating a table for showing length of wiring.

FIG. 10B is another view illustrating the table for showing length of wiring.

FIG. 10C is another view illustrating the table for showing length of wiring.

FIG. 10D is another view illustrating the table for showing length of wiring.

FIG. 11 a flow chart showing procedures for generating the table for illustrating length of wiring.

FIG. 12 is a flow chart for generating a part of a wiring table as to a designated (referenced) connector.

FIG. 14A is a view illustrating a wiring table.

FIG. 14B is another view illustrating the wiring table.

FIG. 14C is another view illustrating the wiring table.

FIG. 16 is an example of the wiring table thus completed.

FIG. 20 is another example of the wiring table.

FIG. 25 is an example of a connection information table.

FIG. 30 is a view showing contents of a list.

DESCRIPTION OF THE PREFERRED EMBODIMENT

1. First Embodiment

Figure 1:
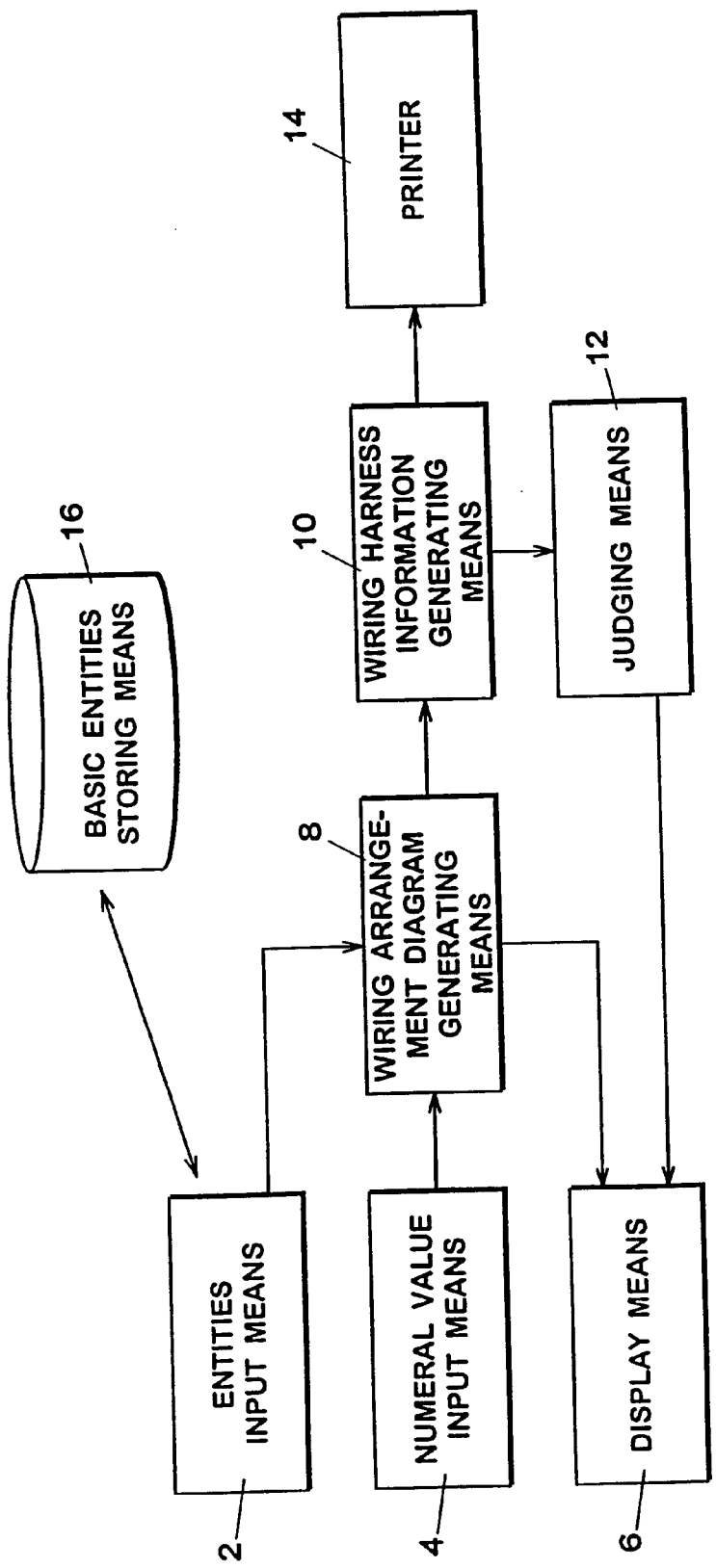
FIG. 1 is a block diagram illustrating overall structure of an embodiment of an apparatus for processing information to manufacture wiring harnesses in the present invention.

FIG. 1 is a block diagram illustrating the overall structure of an embodiment of an apparatus for processing information on wiring harnesses in the present invention. Entities representing connectors, binding parts and wirings are stored in basic entities storing means 16. Further another entity representing connection between the connectors being connected to each other is also stored in the basic entities storing means 16. Entities input means 2 is the means for inputting, arranging and connecting the entities by selecting the entities stored in the basic entities storing means 16.

Numeral value input means 4 is the means for inputting numeral value and character to relate with each of the entities described above. For instance, the numeral value input means 4 is used for assigning codes to the connectors and for specifying a length of the wiring between the connectors.

Wiring arrangement diagram generating means 8 generates a wiring arrangement diagram in accordance with the entities, the numeral value and the character thus inputted. The wiring arrangement diagram thus generated is displayed on a display means 6.

A desired wiring arrangement diagram is obtained by carrying out modifications and/or additional input by an operator of the apparatus via the entity input means 2 and/or the numeral value input means 4 while watching the display means 6.

A wiring table and a diagram of an independent wiring harness (hereinafter referred to as independent wiring harness diagram) as information on the wiring harness are generated in accordance with the entities, the numeral value and the character in the desired wiring arrangement diagram with consideration of connection between terminals of each connector by a wiring harness information generating means 10. At that time, judging means 12 judges whether or not the diagram of the independent wiring harness thus generated complies with a predetermined rule. The wiring table and the diagram of the independent wiring harness thus generated are outputted with a printer 14.

As described above, both the wiring table and the independent wiring harness diagram can be obtained by inputting the wiring arrangement diagram. Further, the judgement can be obtained whether or not the diagram of the independent wiring harness thus generated comply with the rule.

Figure 2:
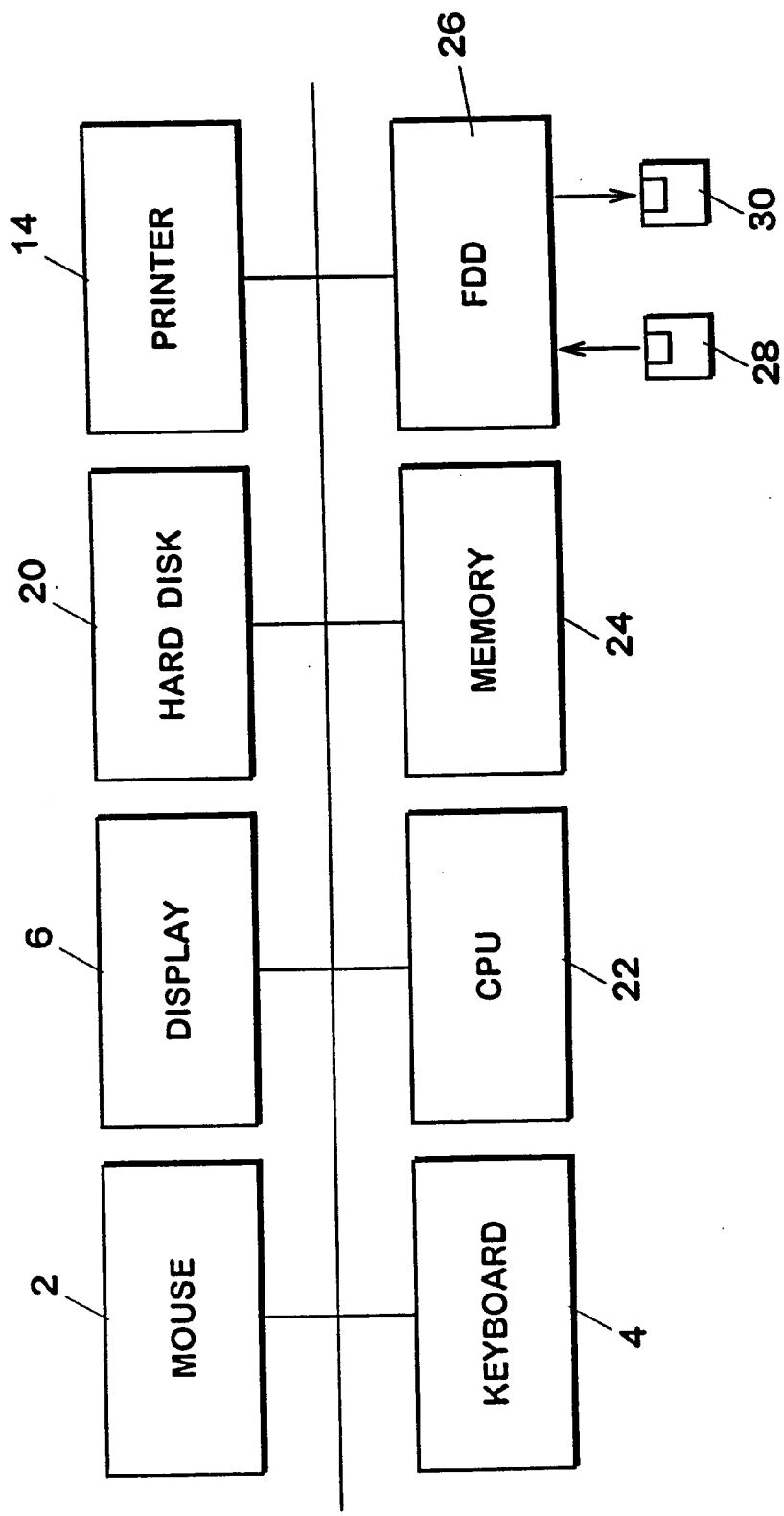
FIG. 2 is a diagram illustrating hardware structure of the apparatus shown in FIG. 1 using a CPU and peripherals.

FIG. 2 is a diagram illustrating hardware structure using a CPU embodying the means shown in FIG. 1. A mouse 2, a keyboard 4, a display 6, the printer 14, a hard disk 20, a memory 24 and a flexible disk drive 26 (FDD) are connected to the CPU 22.

Programs for the operating system such as Windows™ 95 of Microsoft Corp. and the like are stored in the hard disk 20. The operating system carries out the basic controls of the entire system such as displaying, printing, inputting and outputting of data.

In addition, another program for processing the information on the wiring harness is stored in the hard disk 20. The program is installed in the hard disk 20 from flexible disk(s) through the FDD 26. The program may be downloaded into the hard disk 20 through a communication line.

The program for processing the wiring harness information stored in the flexible disk(s) 28 may be executed directly on the CPU 22 or may be executed after decompressing. Further, the program includes a program which can be executed by combining with the operating system or function(s) of other program(s). For instance, a program for computer-aided design (hereinafter referred to as CAD) generally used for graphics can be used in order to perform processing of graphics in the apparatus. In addition, the program may be a program which executes all the functions by itself.

Further, entities such as the connectors, the binding parts, wirings and that of connections are stored on the hard disk 20.

Figure 3:
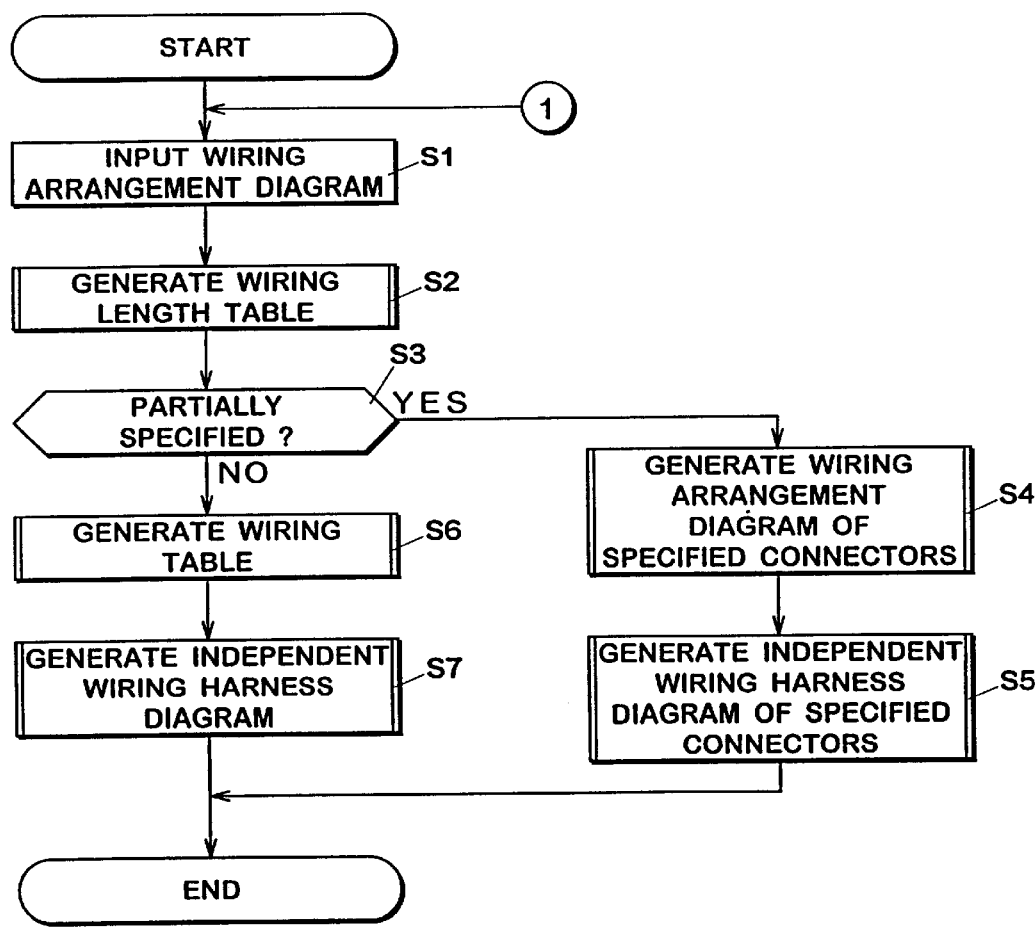
FIG. 3 is a flow chart showing overall procedures of a program for processing the information of the wiring harnesses.

FIG. 3 is a flow chart showing overall procedures of the program for generating the information on the wiring harness. At first, a wiring arrangement diagram is inputted in step S1. In other words, the wiring arrangement diagram is generated by the CPU 22 in accordance with input of the operator through the mouse 2 and the keyboard 4.

Figure 4:
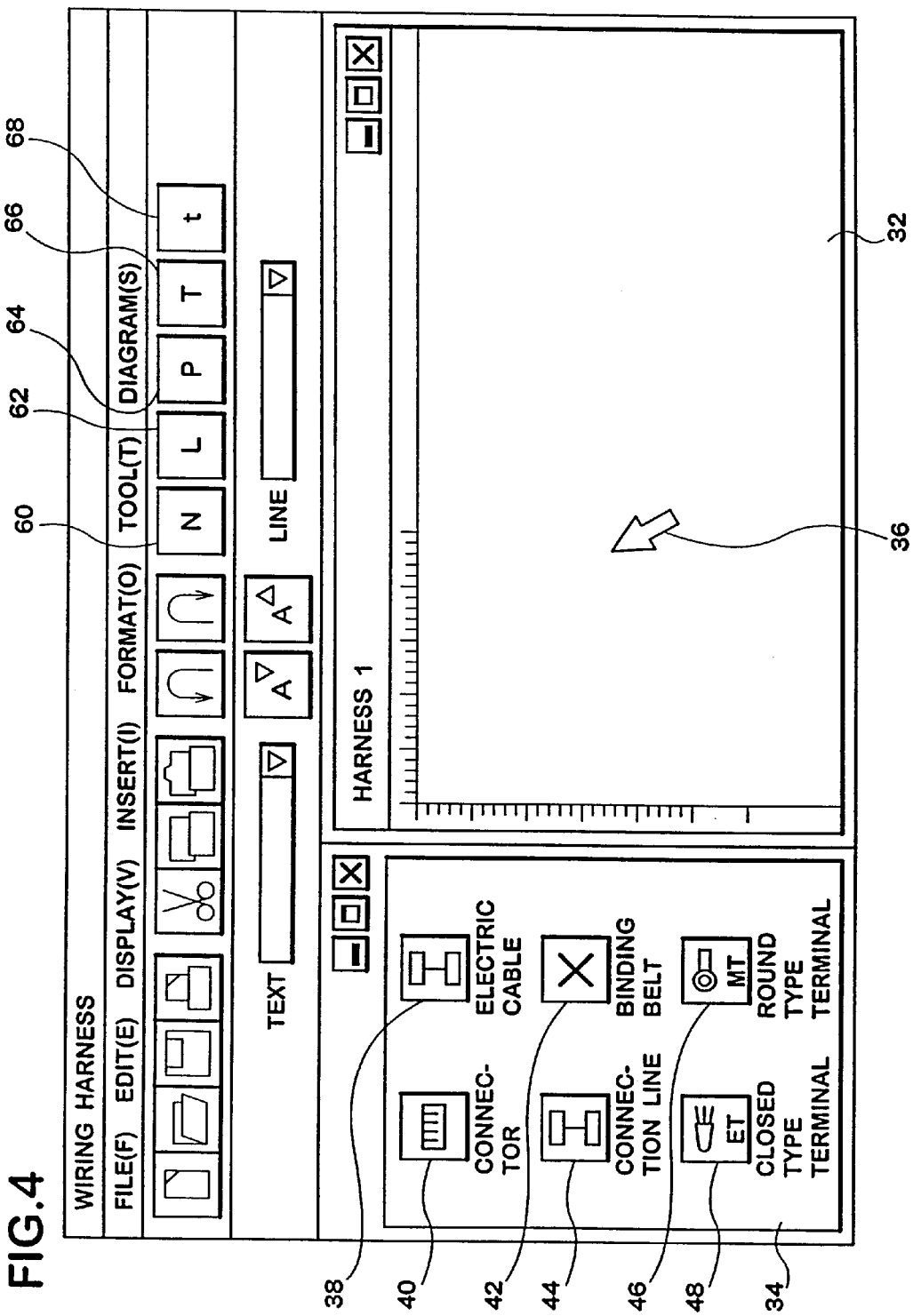
FIG. 4 is a view illustrating a display screen for inputting a wiring arrangement diagram.

FIG. 4 shows a display screen of the display 6 for inputting the wiring arrangement diagram. A work window 32 is an area for generating the wiring arrangement diagram. Also, a basic entities window 34 is an area for displaying icons representing the basic entities stored in the hard disk 20. In this embodiment, icons 38, 40, 42, 44, 46 and 48 respectively representing an electric cable forming the wiring, the connector, a binding belt forming the binding portion, the connection, a round type terminal, a closed type terminal and a flat type terminal are displayed on the basic entities window 34.

The icons 38 through 48 of the basic entities are allocated on the work window 32 by dragging the icons with control of the cursor position of the mouse 2. In this way, a desired wiring arrangement diagram is generated on the display screen. Processing for each of the entities is similar to that of ordinary CAD applications.

Figure 5A:
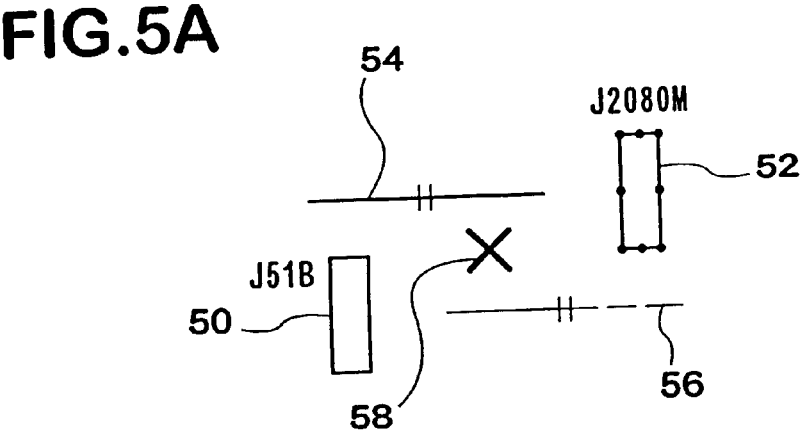
FIG. 5A is a view illustrating an input of the wiring arrangement diagram.

FIGS. 5A through 5D show an example of procedures for generating the wiring arrangement diagram. At first, basic entities needed for generating the diagram are allocated on the work window 32 by selection as shown in FIG. 5A. In this case, the connectors 50 and 52, an electric cable 54, a connection 56 and the binding belt 58 are selected. Identifiers are automatically provided to each of the entities thus selected. Each of the identifiers consist of "name of the entity . serial number of the part". In case of FIG. 5A, identifiers such as "connector. 1" "connector. 2", "electric cable. 1", "connection. 1" and "binding belt. 1" are provided. These identifiers thus provided are stored in the memory 24 and are not displayed on the display screen.

Additional codes can be provided to the connectors beside the identifiers being provided for the CPU 22 by the operator of the apparatus. The additional codes are provided by inputting the codes with the keyboard 4 so as to relate with selected entities after clicking a code input icon 60 for selecting the entities. Additional codes such as "J2080M" and "J51B" are respectively provided to the connector 52 and the connector 50 in FIGS. 5A through 5D. These codes are respectively displayed adjacent to the related entities on the display screen of the display 6 as well as being stored in the memory 24.

Thereafter, a desired wiring arrangement diagram is generated by connecting each of the entities with the electric cable after moving the positions of the entities. In case of FIG. 5B, one end of the electric cable 54 is connected to the connector 50, and the other end thereof is connected to the connector 52. The length of the electric cable 54 can be varied under control of the mouse 2. Both ends of the electric cable 54 are connected to the connectors 50, 52 by adjusting the length thereof. In this embodiment, the apparatus is controlled to display both ends of the electric cable 54 in red when the both ends thereof are connected to the connectors 50, 52. In this way, both ends of the electric cable 54 are reliably connected to the connectors 50, 52.

Figure 5B:
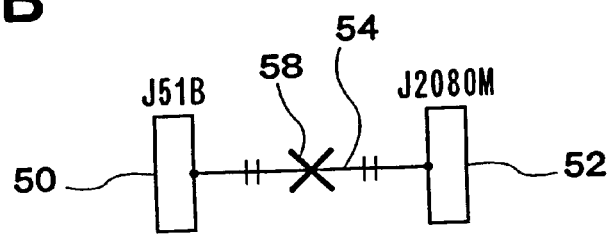
FIG. 5B is a view illustrating relocation of the input shown in FIG. 5A.
Figure 5C:
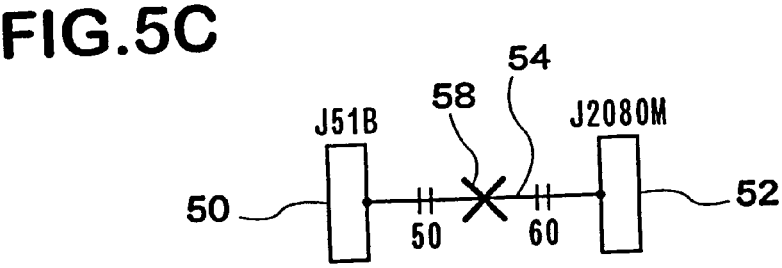
FIG. 5C is a view illustrating relocation of the input shown in FIG. 5B.

Next, the binding belt 58 is allocated as shown in FIG. 5B. Further, an actual length "50" of the electric cable 54 from the connector 50 to the binding belt 58 is inputted with the keyboard 4 after clicking another icon 62 for inputting the length shown in FIG. 4. An actual length "60" of the electric cable 54 from the connector 52 to the binding belt 58 is inputted in similar manner. These lengths are stored in the memory 24 so as to relate with the electric cable 5, and are displayed on the display screen as shown in FIG. 5C.

Figure 5D:
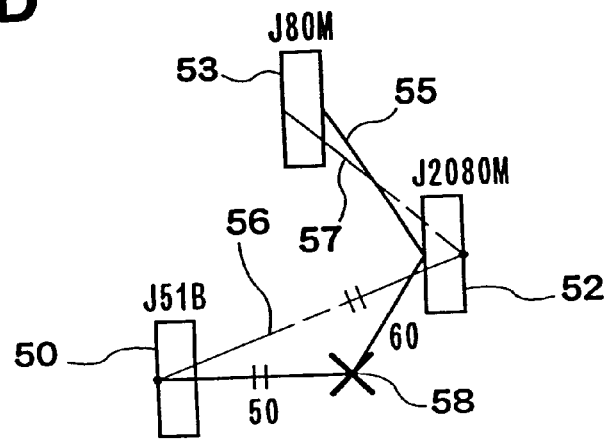
FIG. 5D is a view illustrating relocation of the input shown in FIG. 5C.

Thereafter, a positional relation among the connector 50, the binding belt 58 and the connector 52 are determined by moving the connector 52 on the display screen as shown in FIG. 5D.

In order to clarify the connection between the connector 50 and the connector 52, the connection 56 is used for connecting therebetween. The connection 56 is displayed in a certain color (or a certain type of line) capable of being clearly distinguished from the electric cable 54.

Further, other entities such as a connector 53, an electric cable 55 and a connection 57 are arranged (see FIG. 5D).

On completion of the arrangement, properties of the connectors 50, 52 and 53, and the connections 56 and 57 are inputted through the keyboard 4. The input of these properties is carried out by clicking an icon 64 for inputting properties after selecting the entities.

Figure 6A:
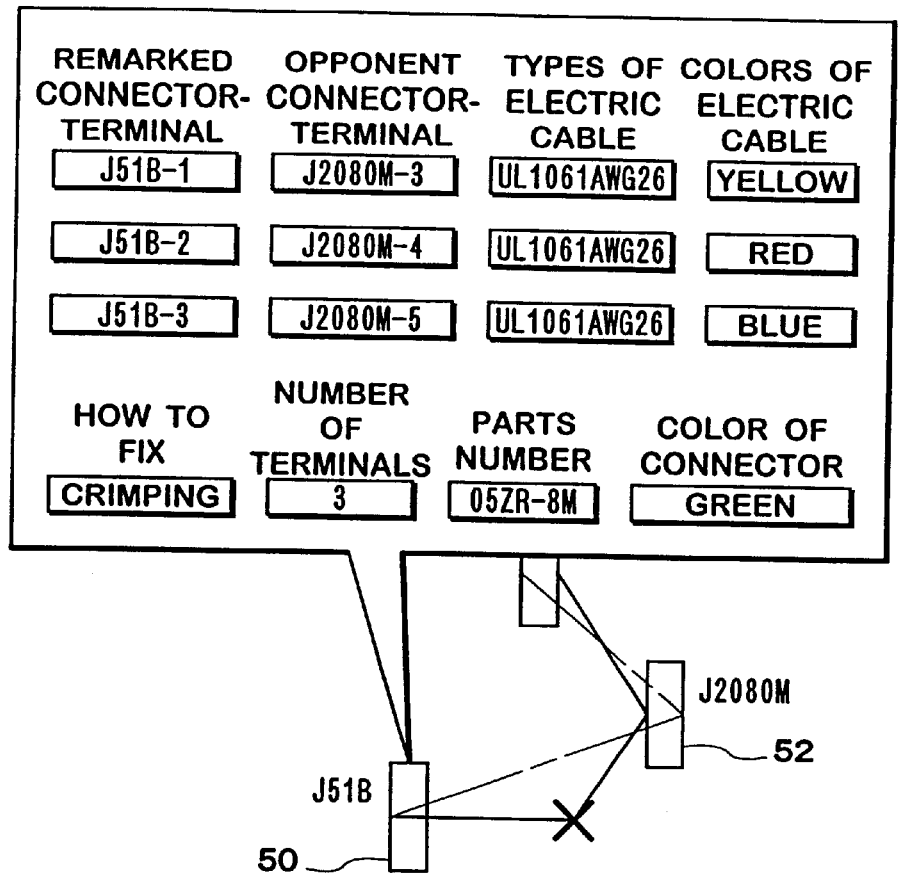
FIG. 6A is a view illustrating a dialogue for inputting details of connectors, a type of the wire(s) and other information.

A dialogue display for inputting the properties shown in FIG. 6A is displayed on the screen by clicking the icon 64. Type, number of terminals, parts number and color of the connector are inputted in the dialogue display. "Name of connector—terminal number" are displayed on the "remarked connector" column and stored in the hard-disk 20 as a result of processing by the CPU 22, such as "J51B-1", "J51B-2" and "J51B-3" displayed in FIG. 6A. Name of the connector and the terminal being connected to the first terminal of the remarked connector ("J51B-1") is inputted by the operator through the keyboard 4. The name of the connector being connected to the remarked connector is hereinafter referred to as an opponent connector. In an example shown in FIG. 6A, "J2080M-1" is inputted as the opponent connector. In addition to the name of the opponent connector and the terminal thereof, both colors and types of the electric cables connecting between the terminal of the remarked connector and that of the opponent connector are inputted. In the example shown in FIG. 6A, "UL1061AWG26" "yellow" are inputted. Similar inputs are carried out for other terminals of both the remarked connector and the opponent connector.

Figure 6B:
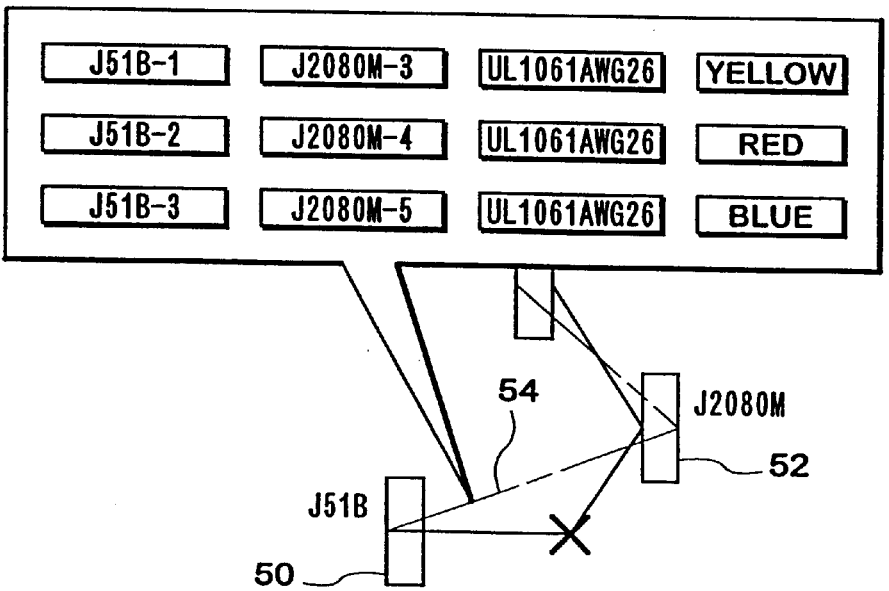
FIG. 6B is a view illustrating another dialogue for inputting information.
Figure 7:
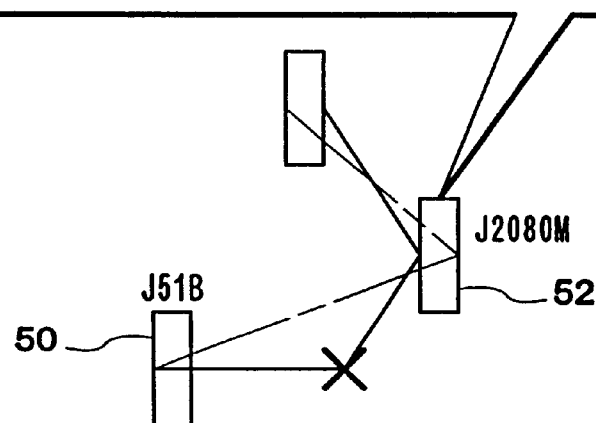
FIG. 7 is a view illustrating another dialogue for inputting information.

After the inputs, properties of both the connection 54 and the connector 52 are inputted. In this embodiment, the CPU 22 uses the inputted properties of the connector 50 for other properties to be inputted. In this way, it is not necessary to input properties of the connection 54 (see FIG. 6B). Further, in respect of the connector 52, the properties of the opponent connector are automatically inputted when the properties of the connector 50 have been inputted. Inputs for generating the wiring arrangement diagram are carried out as described above.

Figure 8:
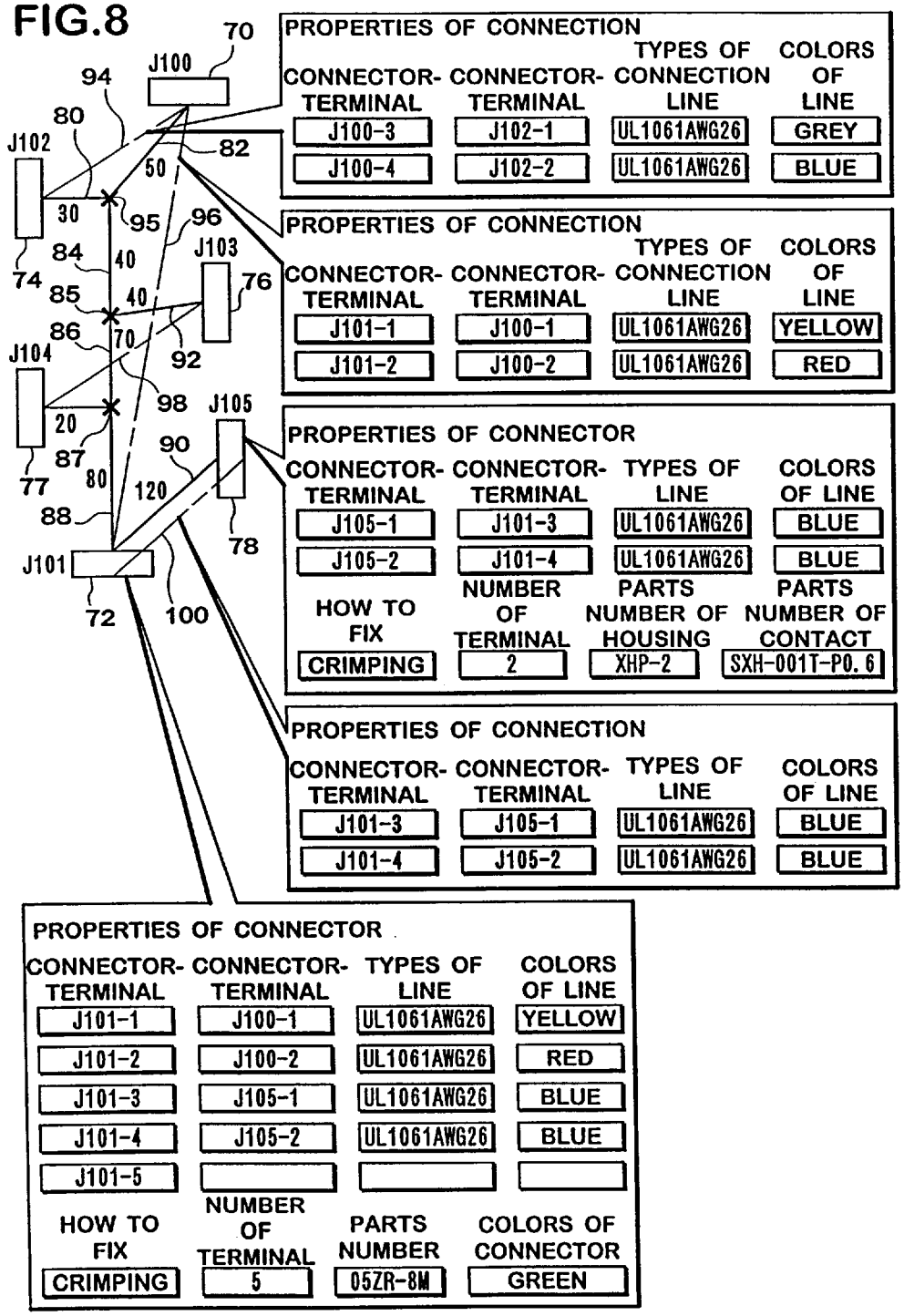
FIG. 8 is an example of a wiring arrangement diagram thus inputted.

Further, description will be made in an assumption that the wiring arrangement diagram shown in FIG. 8 has already been inputted. Although, there are connectors and connections that do not show their properties as shown in FIG. 8, it is assumed that the properties of those have already been inputted.

Upon inputting all the data for generating the desired wiring arrangement diagram, either of an icon 66 or another icon 68 both for generating the independent wiring harness diagram is clicked with the mouse by the operator (see FIG.

4). By clicking either of the icons, the independent wiring harness diagram is generated in accordance with procedures described hereunder. The icon 66 is an icon representing a command to generate all the independent wiring harness diagram(s) for manufacturing the independent wiring harness(es) included in the wiring arrangement diagram thus generated. And the icon 68 is an icon representing a command to generate the independent wiring harness diagram(s) for manufacturing the independent wiring harness(es) as to the connector(s) specified by the operator.

Once the command to generate the independent wiring harness diagram(s) is inputted, the data for generating the desired wiring arrangement diagram(s) being stored in the memory 24 is transferred to the hard disk 20 by the control of the CPU 22. That is, the data shown in FIG. 8 are stored on the hard disk 20.

Figure 9:
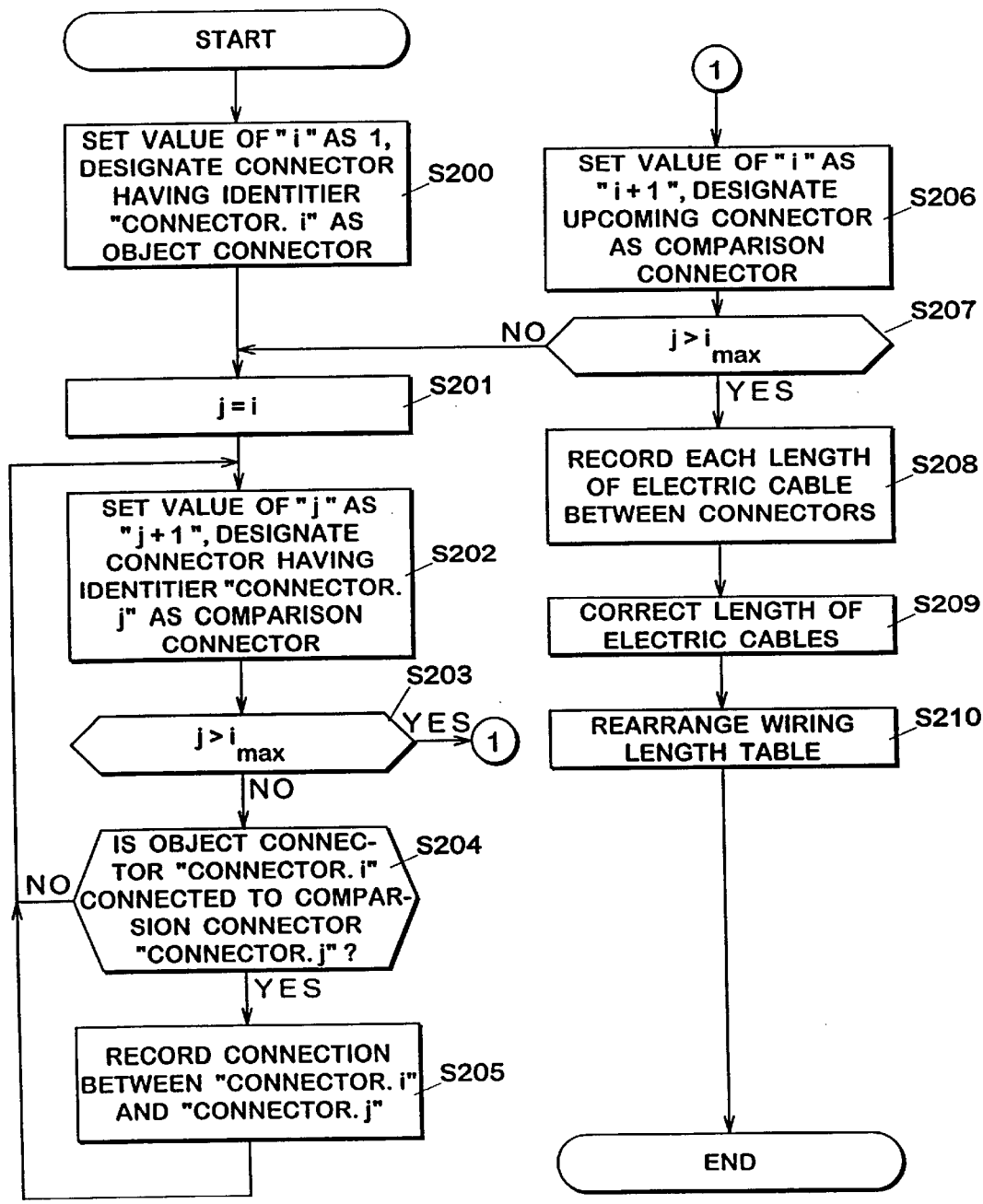
FIG. 9 is a flow chart showing procedures for processing a table for illustrating length of wiring.

Next, a table for showing the connection and cable length (hereinafter referred to as wiring length table) is generated by the CPU 22 in accordance with the desired wiring arrangement diagram thus generated (step S2, FIG. 3). FIG. 9 is a flow chart showing detailed procedures for generating the wiring length table.

In step S200, a value of "i" is set as 1, and a connector having an identifier such as "connector. i" is designated as an object connector. In this case, it is assumed that the identifiers of "connector. 1", "connector. 2", "connector. 3", "connector. 4", "connector. 5" and "connector. 6" are respectively provided to connectors 70, 72, 74, 76, 77 and 78 shown in FIG. 8. Therefore, the connector 70 is designated as the object connector at first.

Then, a value of suffix j of a comparison connector is equalized with the value of "i" in step S201. Further, a connector having the identifier of "connector. j" is designated as the comparison connector as a result of making the value of the suffix j as j+1 in step S202. In other words, the connector 72 is designated as the comparison connector in the step.

Thereafter, the CPU 22 judges whether or not the object connector having the identifier of "connector. 1" is connected to the comparison connector having the identifier of "connector . j" (the connector 72) in step S204. In other words, a judgement is carried out whether or not the object connector 70 is connected to the comparison connector 72. The connection between these connectors is confirmed if these connectors are connected to each other with the connection. Otherwise, the disconnection between the connectors is confirmed. The CPU 22 returns to the step S202 when the disconnection the connectors is confirmed. In this case, the connection between the connectors 70 and 72 with a connection 96 is confirmed.

In this way, the CPU 22 steps forward to step S205 and records that the "connector. I" and "connector . j" are connected to each other in an area of the wiring length table being generated in the memory 24 as shown in FIG. 10A. Although, just the name of the connectors are shown in FIGS. 10A through 10D, identifiers for the connectors are also recorded on the wiring length table.

Next, the CPU 22 returns to the step S202, and the designation of a coming comparison connector is carried out by setting the value of the suffix j as j+1 in the step.

These steps are repeated until all the connectors are designated as the comparison connectors. Upon completing the designation, the CPU 22 steps forward to step S206 by the judgement made in step S203. In the step S206, the coming connector is designated as the comparison connector as a result of setting the value of the suffix i as i+1. Thereafter, the connections between the connectors are recorded on the wiring length table by performing the steps followed to the step S201. On completing the designation of all the connectors as the comparison connectors, the CPU 22 steps forward to step S208 by the judgement made in step S207. FIG. 10B is the wiring length table listing all the connections. In the step S208, each length of the electric cables between the connectors are recorded on the wiring length table by obtaining them from the wiring arrangement diagram.

For instance, a wiring route between J100 and J101 is detected by referring the properties of the electric cable (which indicating both connectors to be connected and the binding belts) in case of recording the wiring lengths between the connector 70 (code J100) and the connector (code J101). In this way, the wiring route of the connector 70—the binding belt 95—the binding belt 85—the binding belt 87—the connector 72 is detected. In the wiring route, a total length of the electric cable between the connector 70 and the connector 72 is recorded on the wiring length table as a sum total of lengths 50, 40, 70 and 80 of the electric wire divided with the binding belts. FIG. 10C is the wiring length table listing all the total lengths of the electric cables between all the connectors thus obtained.

Then, a correction of the total length of the electric cable is carried out in accordance with status of the wirings (step S209). For instance, actual lengths of the electric cables are longer than that of the sum total of both an electric cable 82 and an electric cable 84 when the extension of the electric cable 84 is changed into a different direction from that of the electric cable 82 at the binding belt. In this embodiment, 1 mm is added to the sum total of the electric cables as an correction value for every binding belt accompanying a change of direction. FIG. 10D is the wiring length table listing the correction values.

Thereafter, rearrangement of the table is carried out so as to list the connector(s) on upper line of the wiring length table in descending order of frequent appearance on the table (step S210). In the examples shown in FIGS. 10A through 10D, no rearrangement is carried out because the connector 70 (code J100) which appeared most frequently (twice) is recorded on the uppermost line of the wiring length table. The wiring length table thus generated is stored in the hard disk 20.

Although, the wiring length table is generated in accordance with the entity of connection in the procedures shown in FIG. 9, the wiring length table can be generated using the properties of the connection as shown in FIG. 11. Procedures for generating the wiring length table shown in FIG. 11 will be described hereunder.

In step S251, properties of a connection to be detected are obtained. In this case, properties of a connection 96 shown in FIG. 8 are obtained. In step S252, connection information between the connectors being connected with the connection 96 are extracted in accordance with the properties thus obtained. The facts that the first terminals of the connector 72 (code J101) and the connector 70 (code J100), and the second terminals of these connectors being connected respectively are recorded in the properties of the connection 96. In accordance with the facts, the CPU 22 extracts information of connecting the connector 72 (code J101) to the connector 70 (code J100).

The connection information thus extracted are recorded on the wiring length table (step S253). On the other hand, the connection information are not recorded on the wiring length table when the data thus extracted have already been recorded. In this case, connection information are recorded on the wiring length table as shown in FIG. 10A.

Next, a judgement is carried out whether or not processing has been carried out to all the connections (step S254). The CPU 22 performs the steps followed to the step S251 using coming connections when any of unprocessed connection(s) exist. The wiring length table as shown in FIG. 10 can be generated by carrying out the steps S251 through S255.

The steps performed later in step S208 through the step S210 are the same as the step S208 through the step S210 shown in FIG. 9. Therefore, the wiring length table (wiring table) shown in FIG. 10D is generated similar to the result of carrying out the procedures shown in FIG. 9.

Upon generating the wiring length table, the CPU 22 judges that either of a command for generating all the independent wiring harness diagram(s) or a command for generating the independent wiring harness diagram(s) for specified part(s) is inputted (FIG. 3, step S3).

The following procedures are carried out when the command for generating the independent wiring harness diagram as to a certain connector(s) is inputted by clicking the icon 68 shown in FIG. 4. At first, a wiring table as to the connectors thus specified in step S4 of FIG. 3 is generated.

FIG. 12 is a flow chart showing procedures for generating the wiring table of the connector(s) thus designated (the object connector(s)). Procedures of the flow chart using the connector 72 (code J101) as the designated connector will be described herein. A number "1" is flagged on the lines where the object connectors are recorded thereon as shown in FIG. 14A. Next, a judgement is carried out whether or not the connectors listed on the flagged lines are listed on unflagged lines (step S401). Here, the connector 70 (code J100) is listed on the second line. Therefore, number "1" is flagged on the second line by the CPU 22 in step S402 (see FIG. 14B).

Thereafter, step S401 is carried out again. In other words, the CPU 22 judges again whether or not the connectors listed on the flagged lines including the first and the second line are listed on other lines. Here, the CPU 22 steps forward to step S403 because none of the connectors listed on the flagged line are listed on other lines.

In step S403, rearrangement of the table is carried out so as to list the flagged lines on upper lines as a bunch of lines as well as carrying out relocation of the connectors on the table by giving the top priority to the object connectors. Bunch of lines thus relocated form one independent wiring harness. A blank line is provided between the bunch of lines and line(s) listed below (see FIG. 14C).

Figure 15:
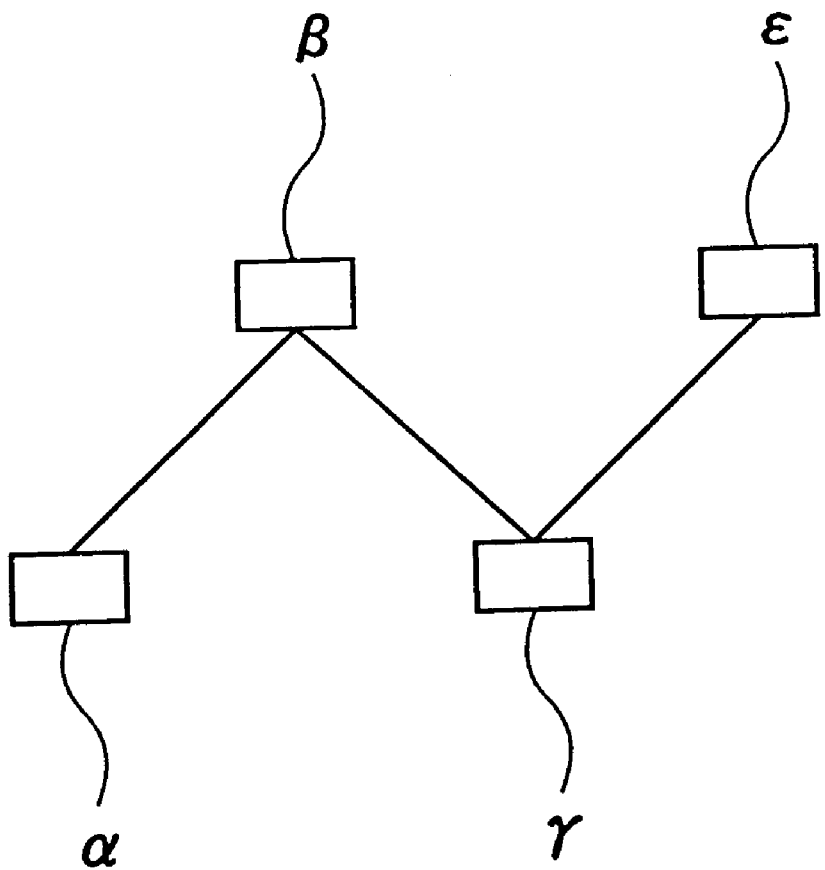
FIG. 15 is an example of connections of the wiring harness which not comply with a predetermined rule.

Then, a judgement is carried out whether or not connections of the independent wiring harness thus obtained comply with a predetermined rule (step S404), because there are some restrictions for manufacturing independent wiring harness(es) when an automatic manufacturing machine is used to manufacture the independent wiring harness(es). For instance, the automatic manufacturing machine can not manufacture an independent wiring harness having more than two connectors such as connectors $\beta$, $\gamma$ between a connector $\alpha$ and a connector $\epsilon$ both of which are most apart from each other in the independent wiring harness as shown in FIG. 15. In that case, an error indication is displayed on the display 6 as an irregular harness, and the CPU 22 returns to step S1 shown in FIG. 3. Thus, the operator needs to store the predetermined rule which fulfills requirements of the automatic manufacturing machine prior to carrying out manufacturing of the wiring harnesses.

Next, details of connections among terminals are obtained from the properties of the connectors when the independent wiring harness thus obtained complies with the predetermined rule (step S405). Further, type and color of the connections are obtained from the properties of the connections (S406). A wiring table shown in FIG. 16 is generated by incorporating a part of the properties obtained from the connectors and the connections shown in FIG. 14C into the table in the steps described above (step S407). In the table, the fifth terminal of the connector 72 (code J101) is indicated as a dummy terminal (a terminal not for connection). The wiring table thus generated is stored on the hard disk 20.

Figure 13:
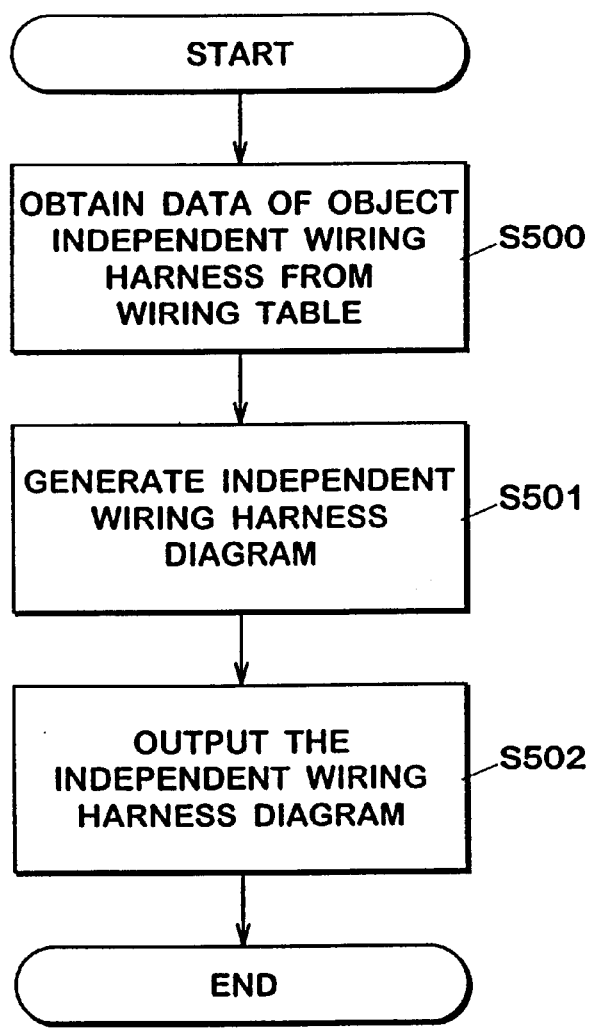
FIG. 13 is a flow chart for generating an independent wiring harness diagram as to remarked connector.

Upon generating the wiring table, the independent wiring harness diagram is generated by the CPU 22 (FIG. 3, step S5). FIG. 13 is a flow chart showing procedures for generating the independent wiring harness diagram.

Figure 17A:
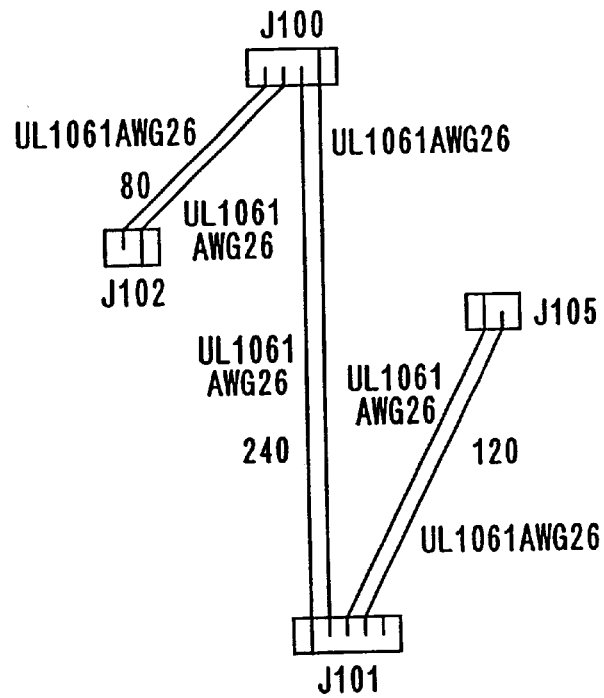
FIG. 17A is a view illustrating the independent wiring harness.

Data of the wiring table are obtained in step S500. Then, the independent wiring harness diagram shown in FIG. 17A is generated in accordance with the data thus obtained (step S501). Further, the independent wiring harness diagram thus generated is outputted from the printer 14 (step S502).

Figure 17B:
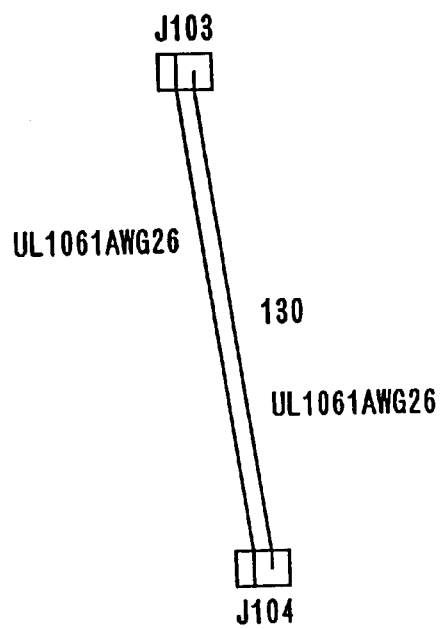
FIG. 17B is another view illustrating the independent wiring harness.

As described above, the independent wiring harness diagram as to the connector(s) specified by the operator can be generated. Solid lines located in the connectors shown in FIGS. 17A and 17B indicate terminals thereof, and the longest lines in each of the connectors show the first terminals thereof.

Figure 18:
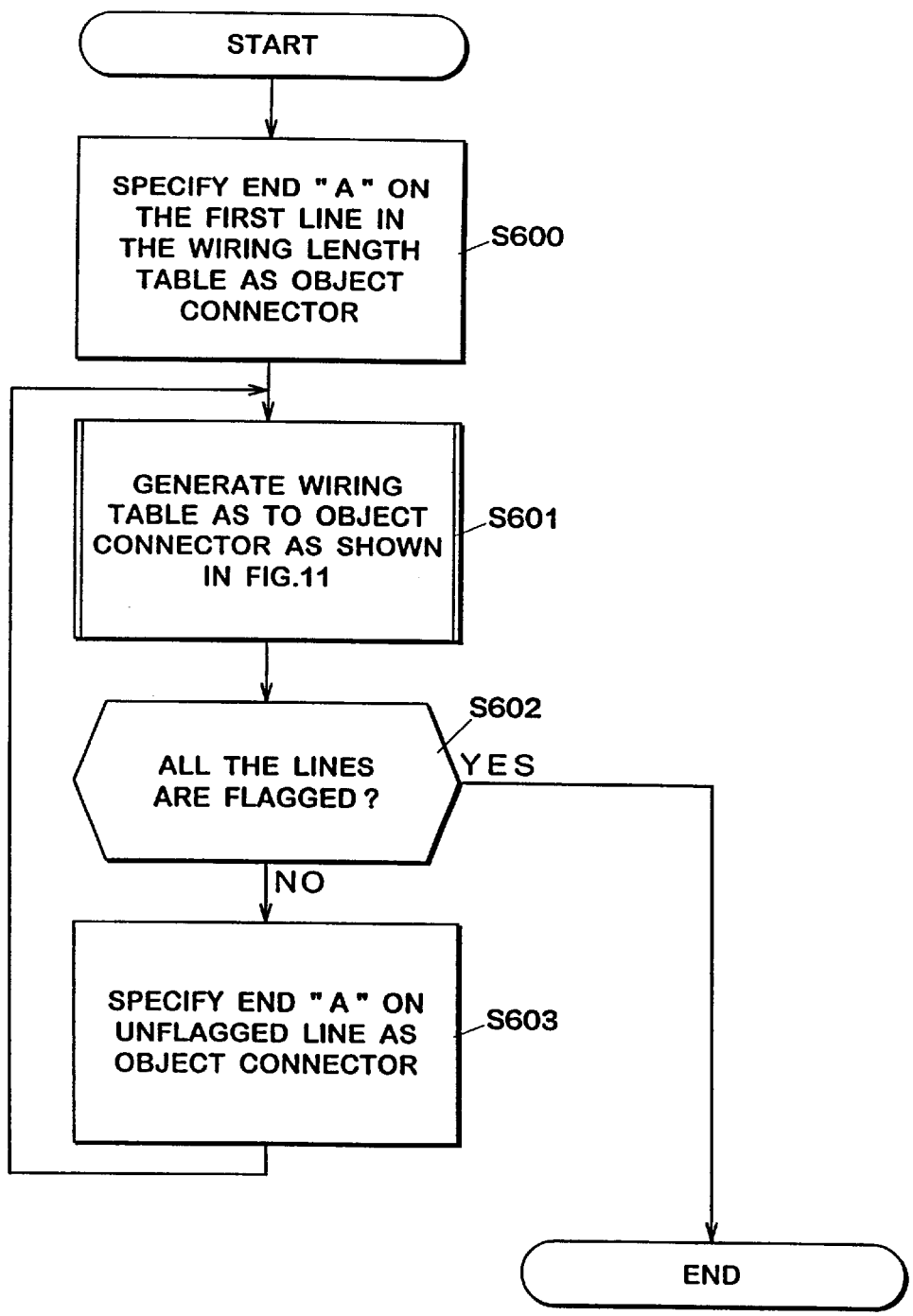
FIG. 18 is a flow chart showing procedures for generating the wiring table.
Figure 19:
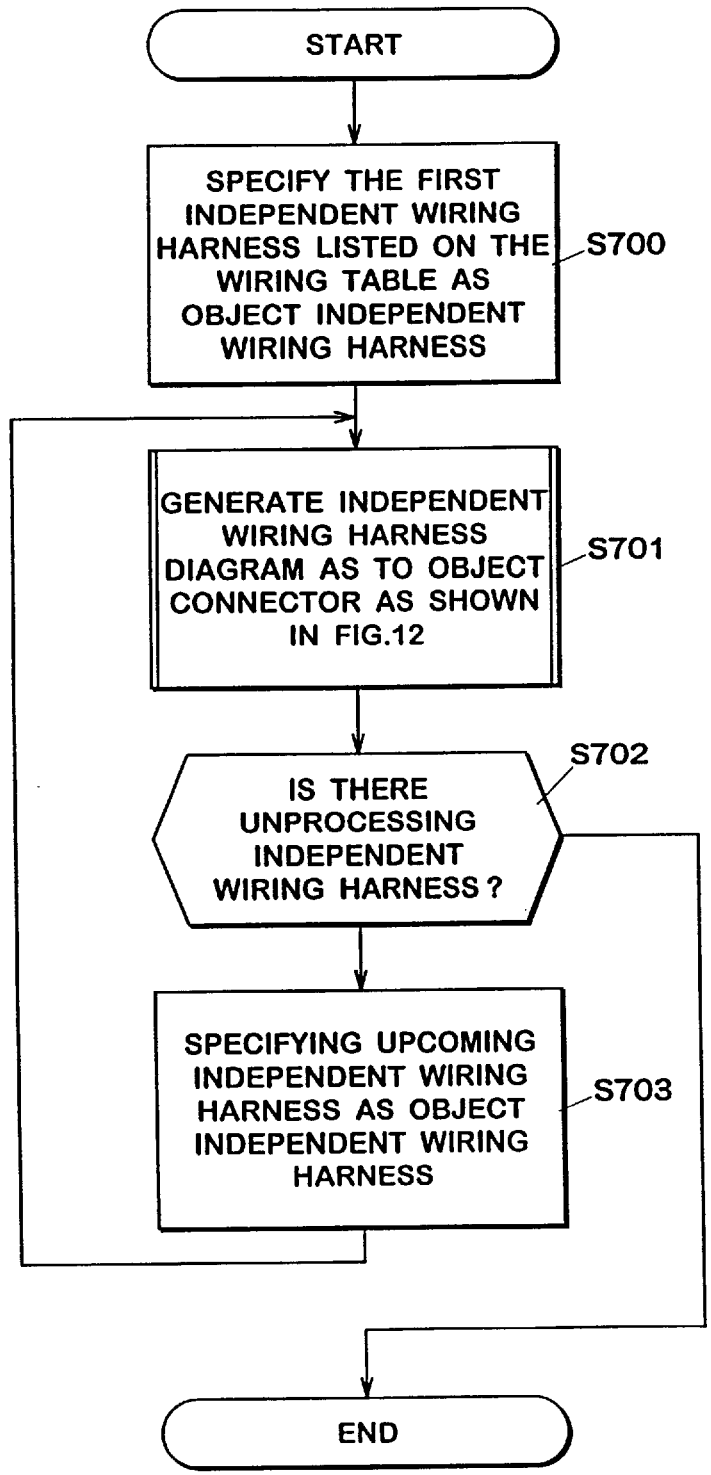
FIG. 19 is another flow chart showing procedures for generating another wiring table as to the remarked connector.

Although, generation of the independent wiring harness diagram as to the connector(s) being specified is described in above embodiment, all the independent wiring harness diagrams can be generated automatically by extracting all the independent wiring harnesses by clicking the icon 66 (shown in FIG. 4). In that case, the CPU 22 steps forward to both steps S6 and 7 from step S3 in FIG. 3. FIG. 18 and FIG. 19 are flow charts showing detail procedures of steps 6 and 7. In the generation of the wiring table shown in FIG. 18, processing performed for generating the wiring table is carried out (step S601, FIG. 12) after setting the connector listed on the uppermost line of the wiring length table as the object connector. Then the CPU 22 judges whether or not all the lines in the wiring length table are flagged (step S602). The CPU 22 performs the steps followed to the step S601 by using all the connectors listed on unflagged lines as the object connectors when none of the lines are flagged.

These steps are performed until all the lines are flagged. As a result, another wiring table shown in FIG. 20 is generated.

Further, independent wiring harness diagrams for all the independent wiring harnesses listed on the wiring table are generated as shown in FIG. 19. By performing those steps, the independent wiring harness diagrams shown in FIGS. 17A and 17B can be generated.

Although, the independent wiring harness diagrams indicating details of the connections between terminals of each connector are outputted in the embodiment described in above, other independent wiring harness diagrams showing the connection briefly as FIG. 15 can be outputted instead of them.

Further, the wiring length table shown in FIGS. 10A through 10D, the wiring arrangement diagrams shown in FIGS. 16 and 20 can be outputted instead of the independent wiring harness diagrams.

Although, the outputs of the wiring table and the independent wiring harness diagram are carried out from the printer 14 in the embodiment described above, these table and diagram can be outputted as data being stored on a data storing medium such as a flexible disk 30 shown in FIG. 2.

2. Second Embodiment

Figure 21:
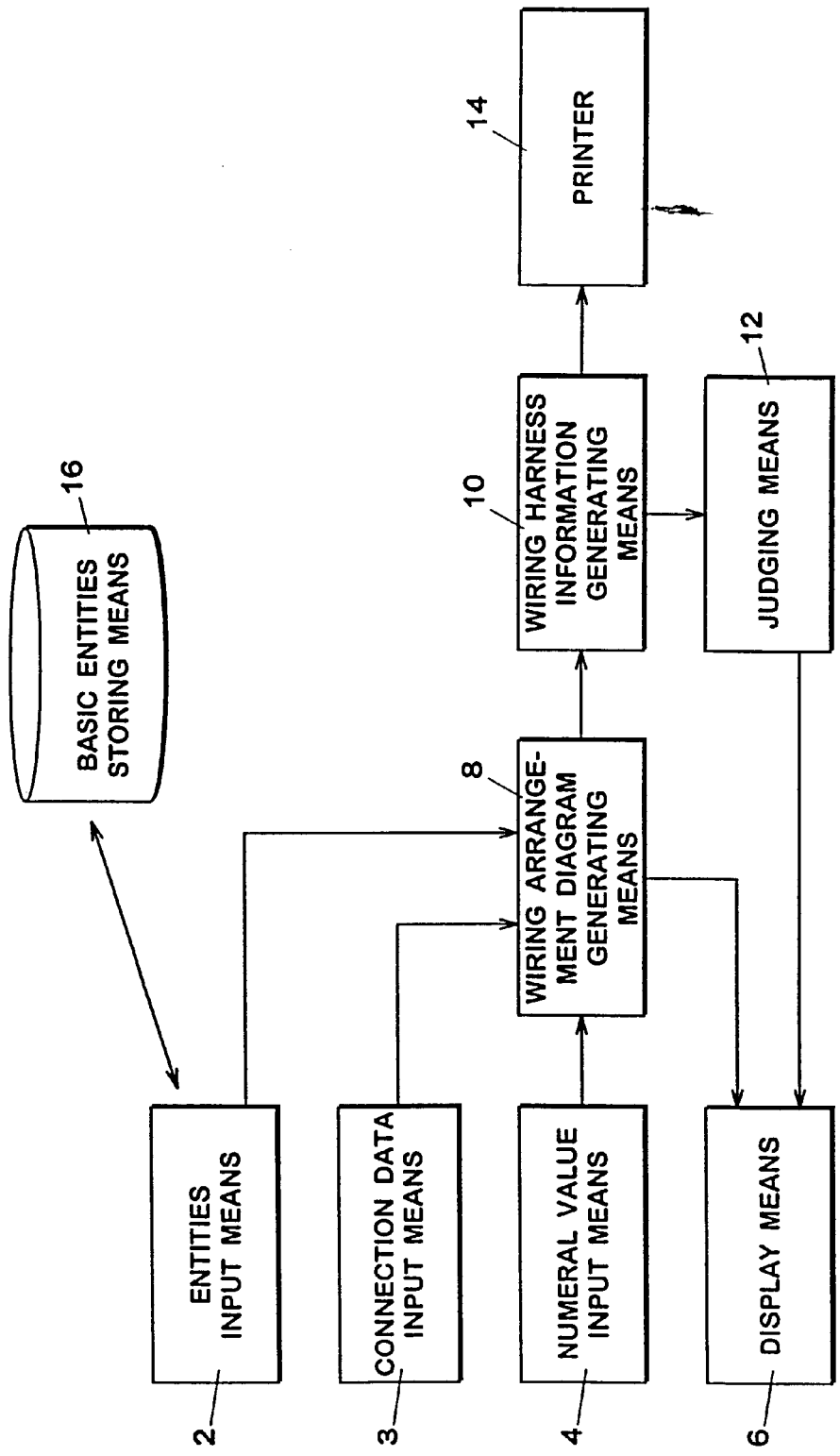
FIG. 21 is a block diagram illustrating another overall structure of a second embodiment of an apparatus for processing information to manufacture the wiring harnesses in the present invention.
Figure 22:
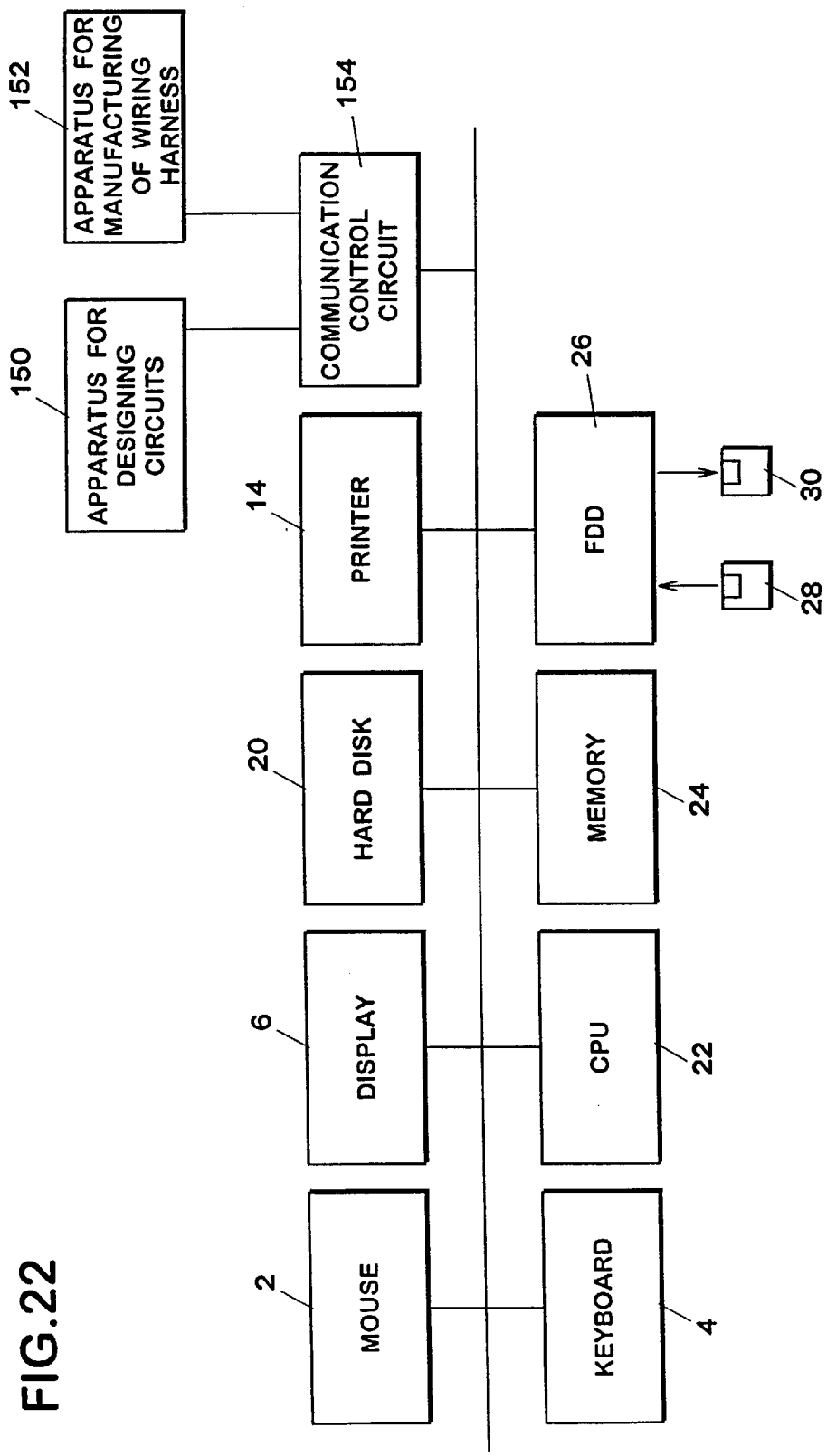
FIG. 22 is another diagram illustrating hardware structure of the apparatus shown in FIG. 20 using the CPU and peripherals.

FIG. 21 is a block diagram illustrating another overall structure of a second embodiment of an apparatus for processing information to manufacture wiring harnesses in the present invention. Although, the information as to the connections is inputted through the entity input means 2 in the first embodiment, these information are inputted through a connection data input means 3. FIG. 22 is another diagram illustrating hardware structure of the apparatus shown in FIG. 21 using the CPU and peripherals. The mouse 2, the keyboard 4, the display 6, the printer 14, the hard disk 20, the memory 24, the flexible disk drive 26 (FDD) and a communication control circuit 154 are connected to the CPU 22. Further, both an apparatus 150 for designing circuits and an apparatus 152 for manufacturing of wiring harnesses are connected to the communication control circuit 154 via local area network (hereinafter referred to as LAN) or other communication lines. The basis functions of this apparatus are similar to that of the apparatus shown in FIG. 2. Description of the apparatus in this embodiment will be focused on the difference from the apparatus in this first embodiment.

In the apparatus shown in FIG. 22, connection information being inputted through the apparatus 150 is provided to the CPU 22 via the communication control circuit 154. That is, the communication control circuit 154 forms connection data input means. The connection data being stored on the flexible disk can be obtained instead of inputting them through the apparatus 150. In that case, the FDD 26 forms the connection data input means. Further, the connection data can be inputted with the keyboard 4. In such case, the keyboard 4 forms the connection data input means.

Beside the programs for the operating system, a program (s) for processing the information of wiring harnesses is stored on the hard disk 20. Further entities of connectors, binding parts and wirings are also stored on the hard disk 20.

Figure 23:
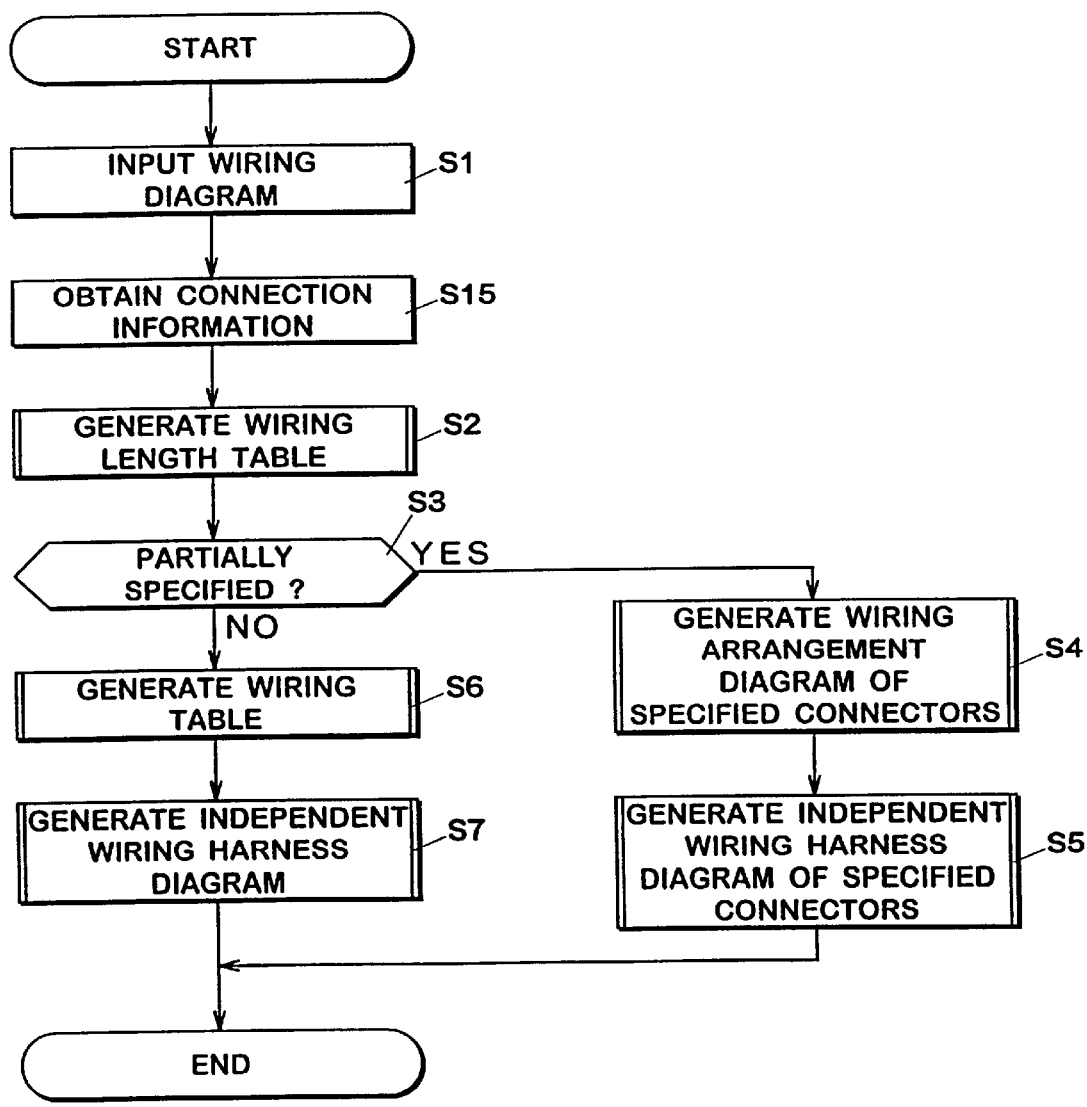
FIG. 23 is a flow chart showing overall procedures of a program for processing the information of the wiring harnesses.

FIG. 23 is a flow chart showing overall procedures of the program for processing the information on the wiring harnesses. At first, a wiring arrangement diagram is inputted in step S1. In other words, the wiring arrangement diagram is generated by the CPU 22 in accordance with the inputs of the operator through the mouse 2 and the keyboard 4.

Figure 24:
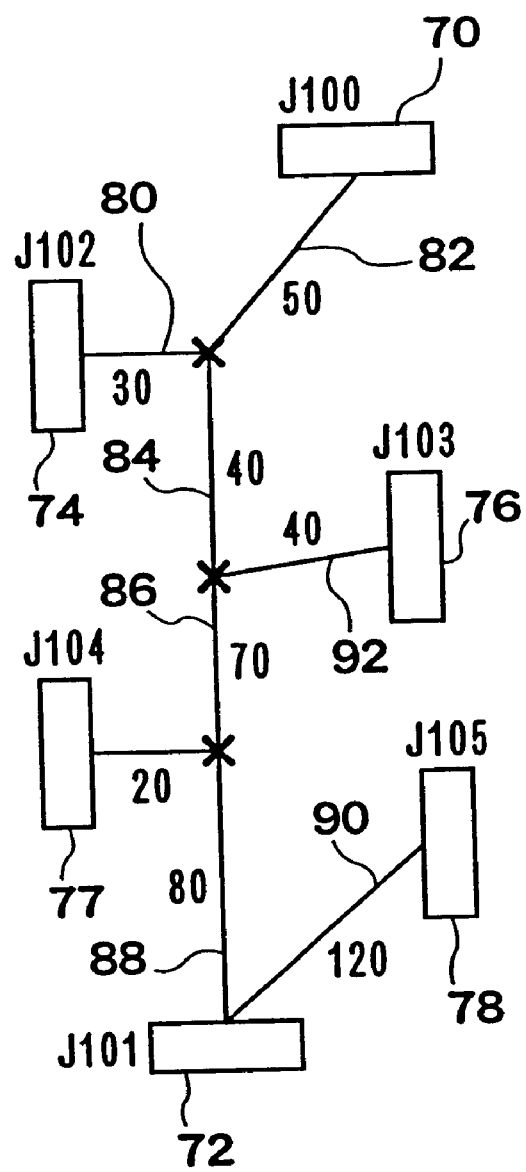
FIG. 24 is another example of the wiring arrangement diagram thus inputted.

FIG. 24 is a view illustrating the wiring arrangement diagram displayed on the screen. The procedures for generating the wiring arrangement diagram are the same as the first embodiment described earlier. As it is clear from a comparison with FIG. 8, no connections and none of properties are illustrated in FIG. 24. In this embodiment, no connections and none of properties are necessary.

Upon completing the generation of the wiring arrangement diagram, the CPU 22 obtains the connection information (FIG. 23, step S15). In this embodiment, the connection information is provided by the apparatus 150. The apparatus 150 for designing circuits is an apparatus for designing circuits including the connections of connectors, such as CAD apparatus. The apparatus 150 for designing circuits may be constituted by the CPU 22 with a CAD program stored on the hard disk 20. In such case, the communication control circuit 154 for apparatus 150 is not necessary.

The CPU 22 outputs a command to the apparatus 150 for sending a connection information table through the communication control circuit 154. On receiving the command, the apparatus 150 transmits the connection information table shown in FIG. 25 to the CPU 22. The connection information table thus transmitted are stored on the hard disk 20 under the control of the CPU 22.

The connection information table shown in FIG. 25 contains data showing connections between the terminals of each connector. In addition, colors and types of electric cables used for the connection and so on are shown in the table. Although, a plurality of columns for inputting lengths of wiring are prepared in the table, no data are inputted therein. It is clearly shown that the first terminal of the connector J101 is connected to the first terminal of the connector J100 on the first line of the connection information table shown in FIG. 25.

Next, the independent wiring harness diagram is generated in accordance with procedures described hereunder when either of the icon 66 or the icon 68 both for generating the independent wiring harness diagram is clicked with the mouse by the operator (see FIG. 4). Data of the wiring arrangement diagram stored in the memory 24 are obtained and stored in the hard disk 20 under the control of the CPU 22. That is, the data shown in FIG. 24 are stored on the hard disk 20.

Figure 26:
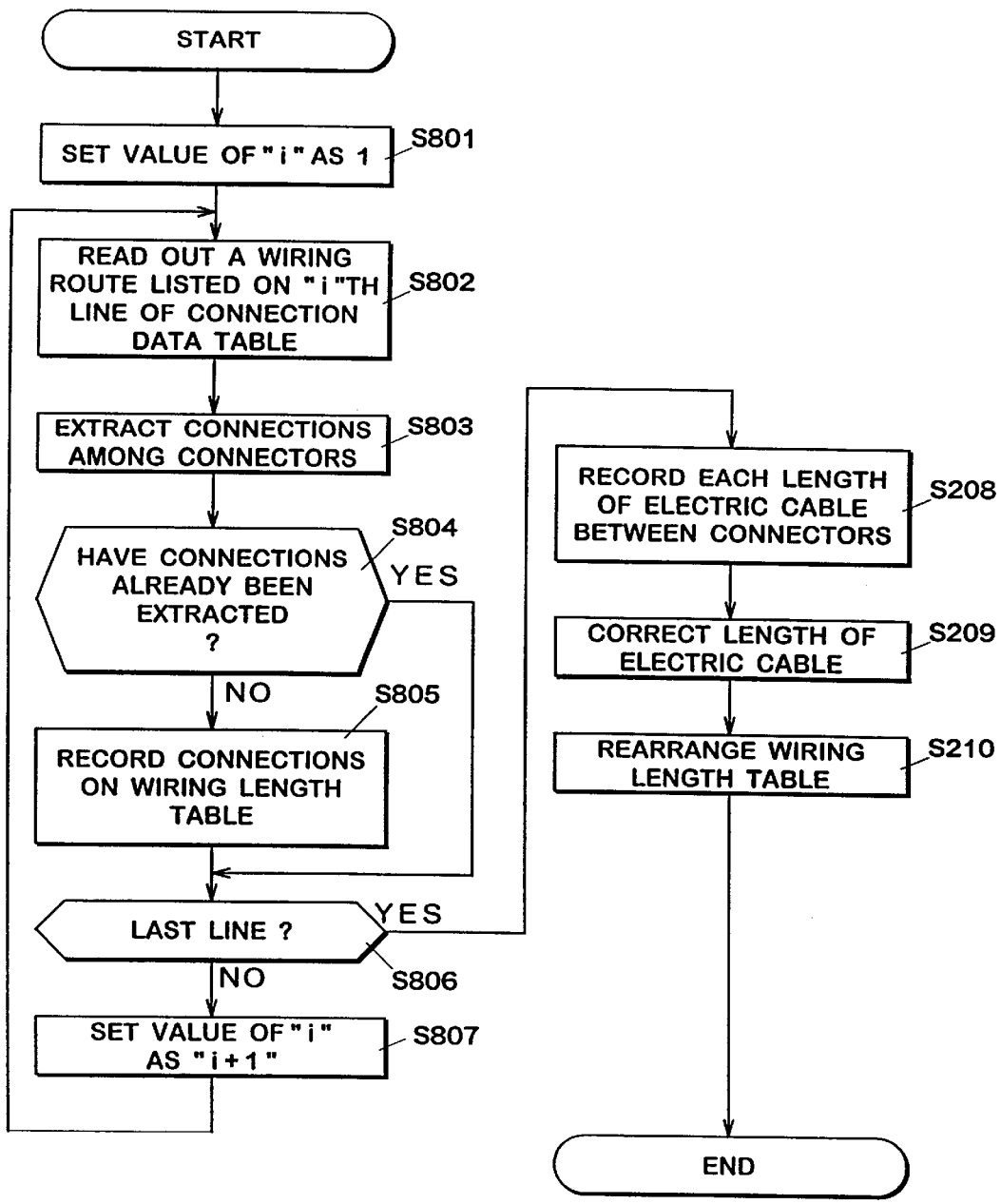
FIG. 26 is a flow chart for showing procedures for generating a wiring length table.

Thereafter, another wiring length table is generated by the CPU 22 in accordance with the independent wiring harness diagram thus generated and the connection information table (FIG. 23, step S2). FIG. 26 is a flow chart showing procedures for generating the wiring length table.

In step S801, a value of "i" is set as 1. Then, the CPU 22 reads out a wiring route listed on "i" line of the connection information table. In the other words, the CPU 22 reads the data indicating the connection between the first terminal of the connector J101 and the first terminal of the connector J100. Then, only the connections between the connectors are extracted from the data thus read out earlier (step S803). In other words, the CPU 22 just the data indicating, connection information table thus transmitted stored, added to the sum total of the electric cables as;

Thereafter, a judgement is performed whether or not the data thus extracted have already been extracted (step S804). If the data have not been extracted before, the connection between the connectors is recorded on the wiring length table as shown in FIG. 10A (step S805). On the other hand, the step S805 is not performed if the data have already been extracted before.

Next, a judgement is performed whether or not the line under processing is the last line of the connection information table. The steps followed to the step S802 are performed continuously until the last line by incrementing the value of "i" when the line under processing is not the last line. As a result of performing these steps until the last line, the wiring length table shown in FIG. 10B is generated.

On completing the processing until the last line, lengths of the electric cables between all the connectors are obtained from the wiring arrangement diagram (step S208). Corrections of the lengths of the electric cables thus obtained are carried out in accordance with status of the wirings (step S209). Thereafter, rearrangement of the wiring length table is carried out so as to list the connector(s) on upper line of the table in descending order of frequent appearance on the table (step S210). Thus, the wiring length table shown in FIG. 10D is generated. The steps performed in step S208 through the step S210 shown in FIG. 26 are the same as the step S208 through the step S210 shown in FIG. 9.

Next, generation of both the wiring table (step S6) and the independent wiring harness diagram (step S7) is performed. Processing for generating these are similar to the processing described in FIG. 3. The difference between the processing described in FIG. 23 and the processing in FIG. 3 is the way to obtain details of the connections between the terminals. Although, the details of the connections are obtained from the properties of the connectors in the flow chart shown in FIG. 3, the details of the connections are obtained from the connection information table in the flow chart shown in FIG. 23.

The independent wiring harness diagram and the wiring table respectively shown in FIG. 17 and FIG. 20 can be generated in this embodiment.

Although, the wiring table is generated as a result of generating the wiring length table in accordance with the connection information table in the embodiment described above, the wiring table can be generated by adding the lengths of the electric cables to the connection information table.

Figure 27:
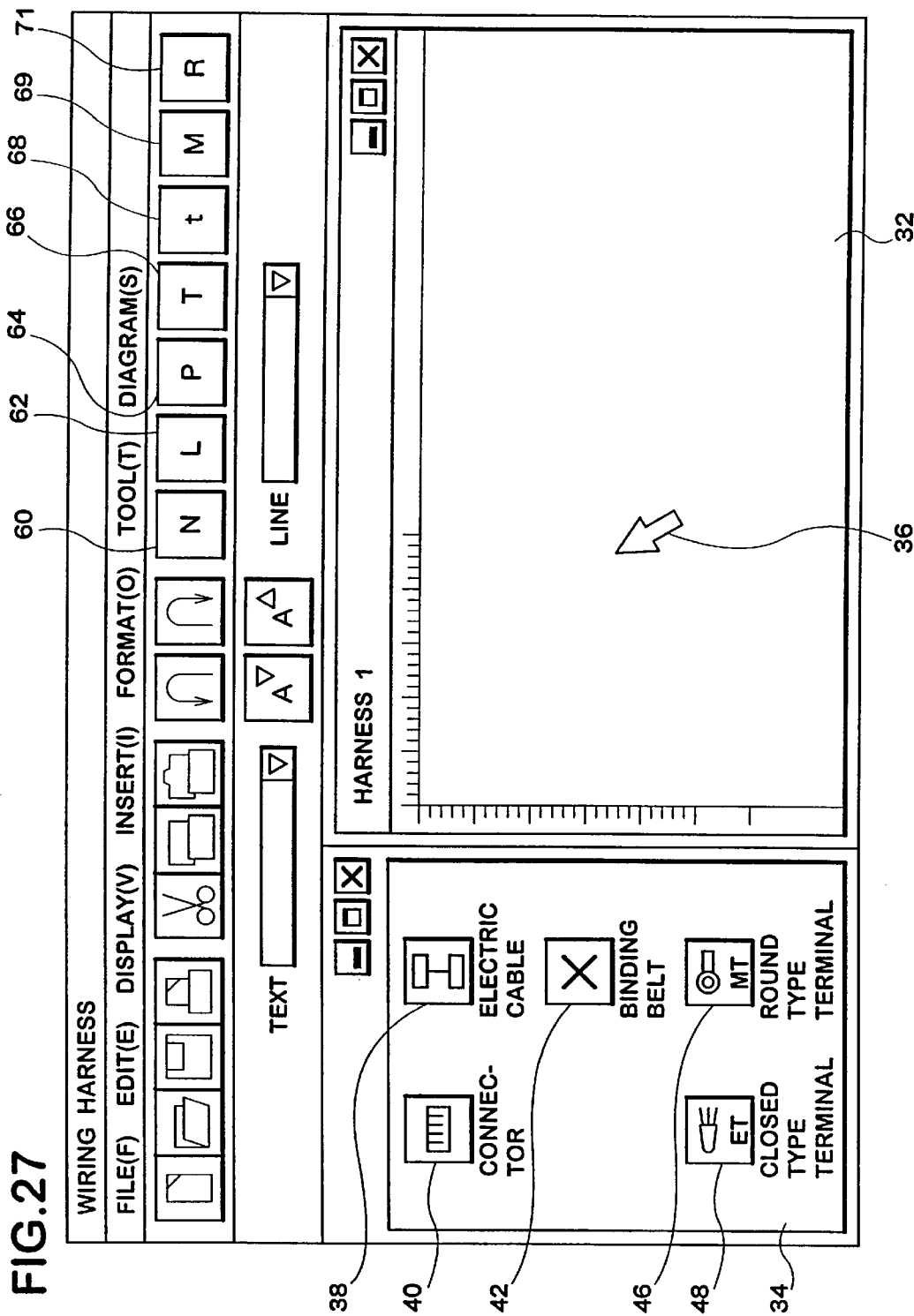
FIG. 27 is a view illustrating a display screen for inputting a connection information table.

In this embodiment, a part of the wiring harness information out of the wiring harness information thus obtained as described above being used in the manufacturing apparatus 152 for manufacturing of wiring harnesses can be transmitted to the manufacturing apparatus 152. In order to transmit the information to the manufacturing apparatus 152, an icon 69 for transmitting the information shown in FIG. 27 is clicked with the mouse by the operator. By clicking the icon 69, the CPU 22 controls the communication control circuit 154 so as to transmit parameters needed to manufacture the wiring harnesses such as number of terminals of each connector, the lengths of the electric cables between all the connectors. In this way, it is not necessary for the operator to input these parameters all over again. As a result, erroneous inputs of the parameters can be decreased and operating accuracy of apparatus is increased.

The parameters mentioned above can be outputted to a storing medium so as to be stored therein, and the parameters thus stored in the storing medium can be read by the manufacturing apparatus 152.

Figure 28:
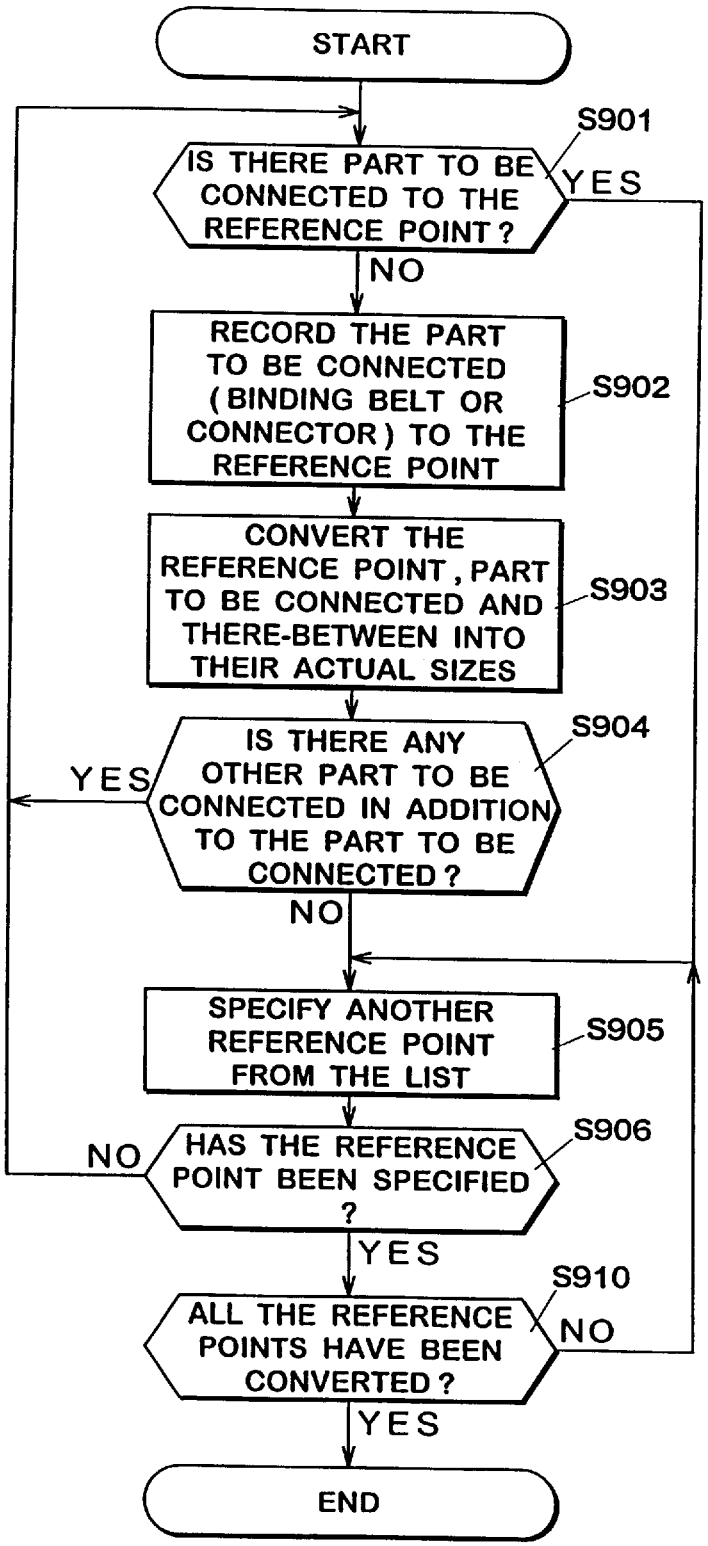
FIG. 28 is a flow chart showing procedures for converting the wiring arrangement diagram into actual sizes.

In this embodiment, a wiring table illustrating actual sizes of the components can be printed out from the printer 14 in accordance with the wiring arrangement diagram thus inputted. FIG. 28 is a flow chart of a program for converting the wiring arrangement diagram into actual sizes. Procedures for converting reduced diagram to the actual sizes will be described hereunder when a wiring diagram shown in FIG. 29 is inputted (that is, the arrangement is displayed on the display screen 6).

At first, an icon 71 for conversion shown in FIG. 27 is clicked with the mouse by the operator. By clicking the icon 71, the CPU 22 starts performing the procedures shown in FIG. 28. In step S901, a judgement is carried out whether or not a reference point has a part(s) to be connected thereto after specifying the reference point. In this case, either one of the connector or the binding belt and so on is specified as the reference point. It is assumed that the binding belt "T. 24" is specified as the reference point.

Figure 29:
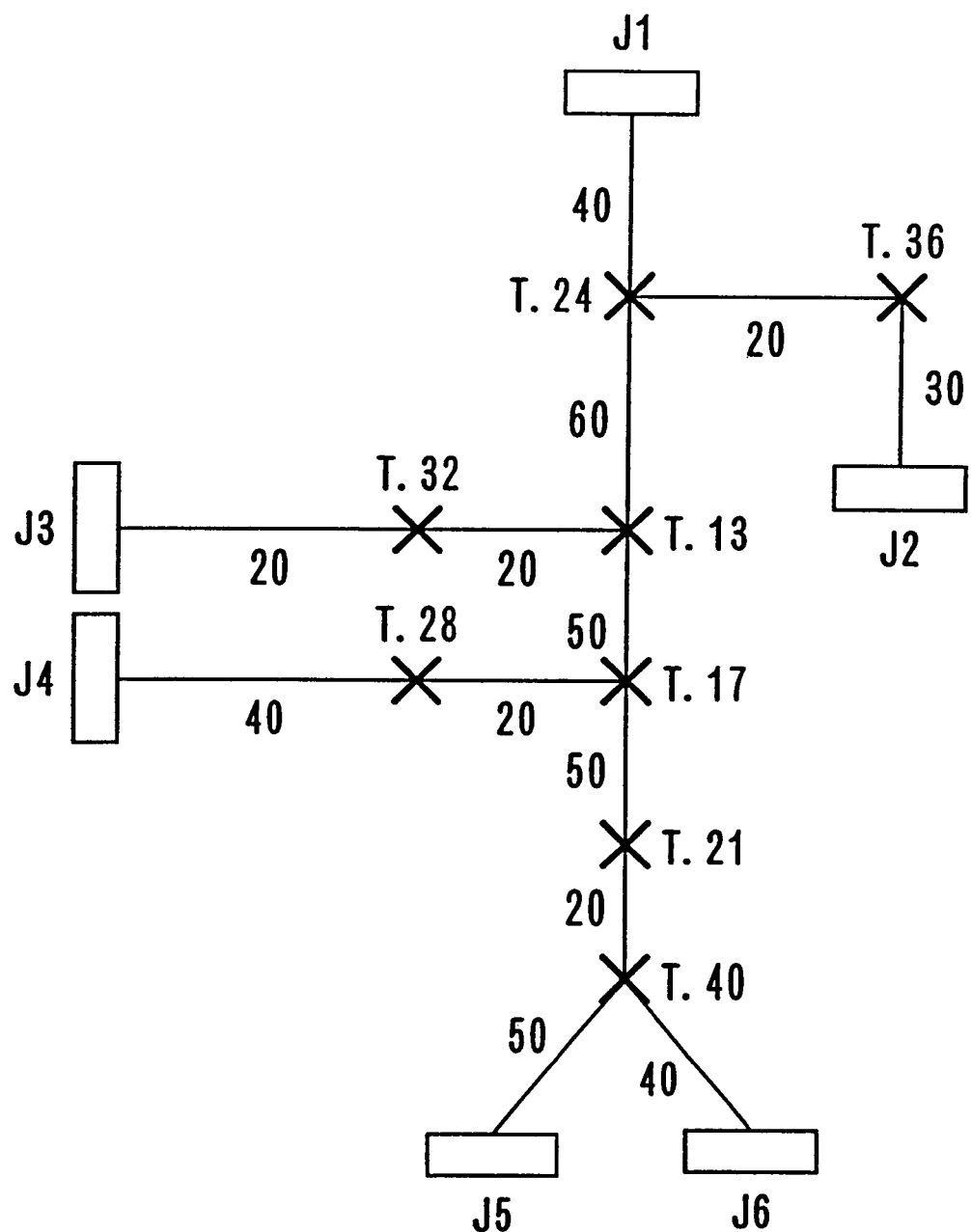
FIG. 29 is a view illustrating a wiring arrangement diagram displayed on the display screen.

As shown in FIG. 29, the binding belt "T. 24" has parts to be connected such as the connector "J1", and other binding belts "T. 36" and "T. 13". As a result of the judgement, the CPU 22 steps forward to step S902. In step S902, the connector "J1" is stored in the memory 24 in a list form. Then, the binding belt "T. 24", the connector "J1" thus stored as the part to be connected and therebetween are converted into their actual size (step S903). In this way, the cursor is moved to a position on the region where the conversion is carried out.

In step S904, a judgement is carried out whether or not other part(s) to be connected to the binding belt "T. 24" (the reference point) exist in addition to the connector "J1". The step S901 is performed if any other part(s) to be connected exist. In this case, the steps S901, S902 and step S903 are sequentially performed because of existence of the binding belt "T. 36" as another part to be connected. The binding belt "T. 36" and the wiring being connected between the binding belt "T. 36" and the binding belt "T. 24" are converted into their actual sizes (step S903). In this way, the cursor is moved to a position on the region where the conversion is carried out. The binding belt "T. 36" is also added to the list stored in the memory 24.

Similar procedures are performed as described above, such as the binding belt "T. 13" connected to the binding belt "T. 24" is added to the list stored in the memory 24 and the binding belt "T. 13" and the wiring being connected between the binding belt "T. 13" and the binding belt "T. 24" are converted into their actual sizes. In any case, the conversions into the actual sizes are carried out without moving the position of the binding belt "T. 24". This is because movement of the reference point causes dislocation between the converted regions and the unconverted regions. Therefore, a proper relationship among each of the components cannot be maintained in actual sizes.

Figure 30:
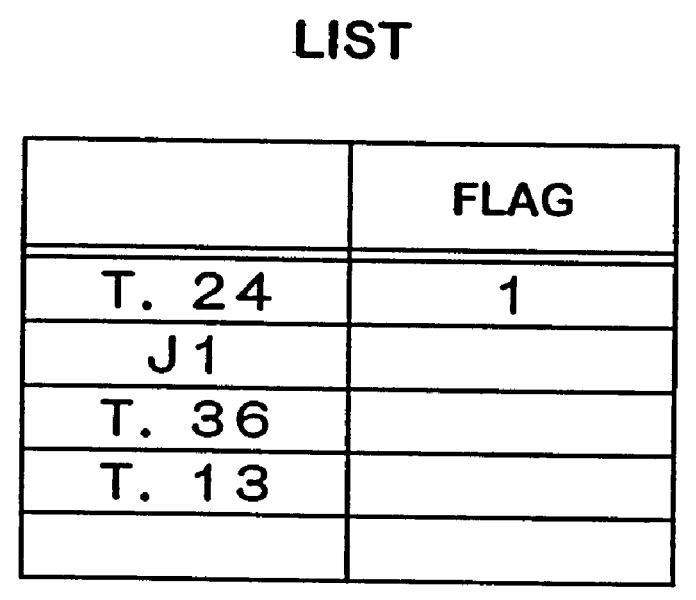

The step S904 and the step S905 are sequentially performed after completing the conversions with respect to all parts to be connected to the binding belt "T. 24". In the step S905 and step S906, another reference point is specified from the one which has not been specified as the reference point. A number "1" is flagged to the part(s) which have been specified as the reference point in the list shown in FIG. 30.

The steps followed to the step S901 are performed using another reference point when unspecified part(s) is listed on the list. In this way, newly specified reference points are recorded on the list, and the conversions are carried out in accordance with the reference points. Thus, the procedures for converting the wiring diagram into actual sizes have been completed when all the parts listed on the list are used as the reference point (step S910).

In the conversion procedures described above, the conversion of the wiring diagram into the actual sizes are carried out while maintaining their angles.

Figure 31:
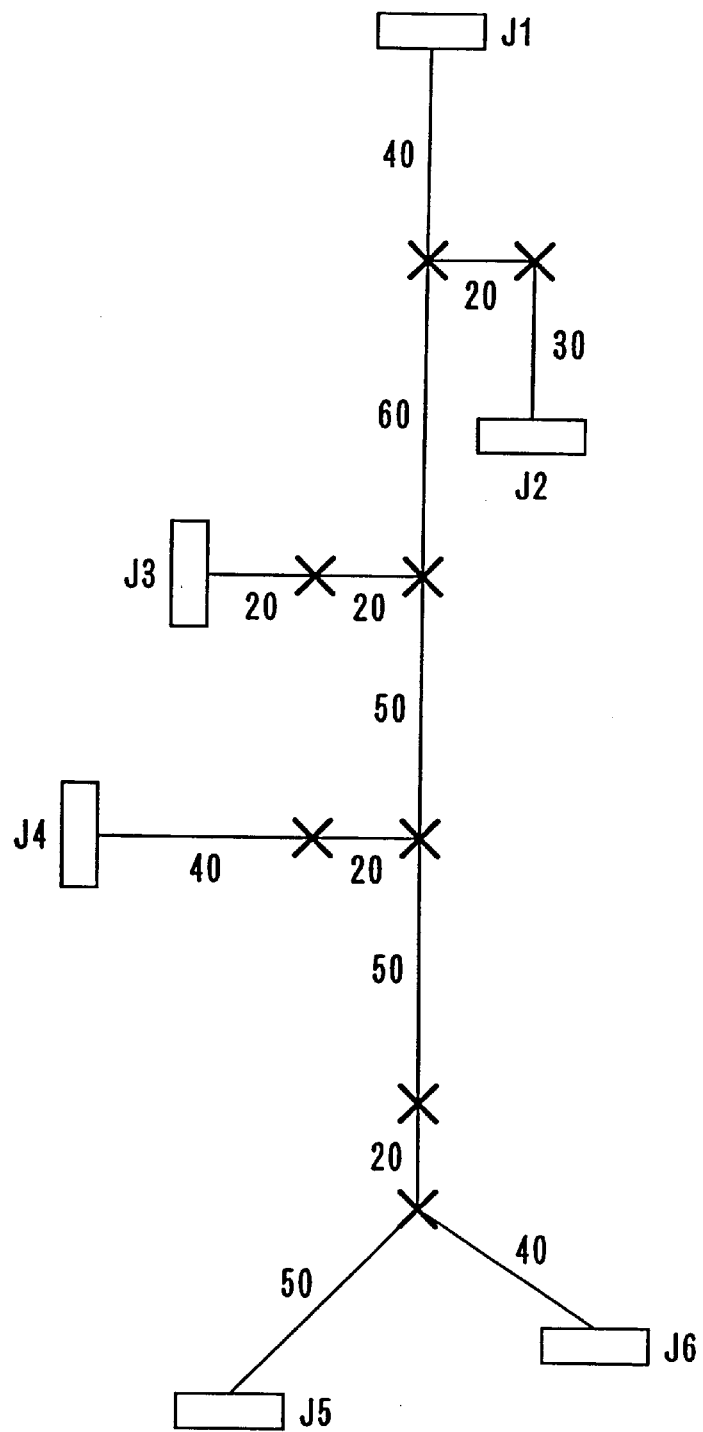
FIG. 31 is a view illustrating the wiring diagram which represents actual length of the wiring harness.

Consequently, the wiring diagram being enlarged into the actual sizes shown in FIG. 31 can be generated. The wiring diagram thus generated is printed out on a paper by the printer 14. Manufacturing process of the wiring harnesses can be carried out easily by pasting (or by directly printing) the wiring diagram shown in FIG. 31 onto a substrate for wiring. In other words, positions for allocating jigs for wiring (supporting members such as nails) can be determined easily and accurately on the actualized wiring diagram shown in FIG. 31 by just disposing the jigs on the arrangement. Similar to above, the independent wiring harness diagrams shown in both FIGS. 15 and 17 can be actualized to the actual sizes, and the independent wiring harness diagrams thus actualized can be used both for simplifying the manufacturing processes and for allocating jigs of wiring.

According to the embodiment described above, the wiring diagram is not actualized on the display screen of the display 6 for carrying out correction work easily. And the wiring diagram is printed out in the actual sizes for simplifying the manufacturing processes and for allocating jigs.

Although, the wiring diagram having actual sizes is printed out by the printer 14, the actualized wiring diagram can be displayed on the display 6 as well as outputting that in a data format.

While, actualization of the wiring diagram or the independent wiring harness diagram is carried out in above embodiment, enlarged or shrank diagrams to their actual sizes can be outputted.

The wiring harness using the electric cable as the wiring is described in the embodiment described above, the present invention can also be applied to a wiring harness using optical fibers as the wiring.

Although, the CPU 22 shown in FIG. 1 and FIG. 22 is used for realizing functions described in above embodiments, a part of or all of the functions can be realized by using hardware such as logic circuits or the like.

While the invention has been described in its preferred embodiments, it is to be understood that the words which have been used and words of description rather than limitation and that changes within the purview of the appended claims may be made without departing from the true scope and spirit of the invention in its broader aspects.

What is claimed is:

1. A method of manufacturing a substrate for wiring, comprising the steps of:

preparing the substrate, directly drawing a wiring diagram in actual size on the substrate, or fixing a sheet illustrating the wiring diagram in actual size on the substrate, disposing a supporting member for wiring at least a position of locating a binding part in the wiring diagram, wherein said wiring diagram is drawn by using harness information generated by the following steps, inputting entities representing connectors, binding parts, wiring length information of the wirings from an input device, inputting a desired wiring arrangement from the input device by referring to a wiring arrangement diagram generated based on the entities and the length information and displayed on the display device, wherein said wiring arrangement diagram includes lines that correspond to the wirings and do not have a length corresponding to actual length of the wirings, and generating the harness information based on the entities and the length information of the desired wiring arrangement.

2. A method for manufacturing a wiring harness in accordance with claim 1, wherein the wiring harness information is generated by additionally considering a connection information inputted from an apparatus for designing circuits.

3. A method for manufacturing a wiring harness using a computer having an input device and a display device, comprising steps of:

inputting entities representing connectors, binding parts, wirings length information of wiring from the input device, inputting a desired arrangement from the input device by referring to a wiring arrangement diagram generated based on the entities and the length information and displayed on the display device, wherein said wiring arrangement diagram includes lines that correspond to the wirings and do not have a length corresponding to actual length of the wirings, and making the wiring harness using information including a total length of wiring between each of the connectors, the harness information being generated based on the entities and the length information of the desired wiring arrangement.

4. A method for manufacturing a wiring harness in accordance with claim 3, wherein the wiring harness information is generated by additionally considering a connection information inputted from an apparatus for designing circuits.

* * * * *